US010951436B2

(12) United States Patent
Maeda et al.

(10) Patent No.: US 10,951,436 B2
(45) Date of Patent: Mar. 16, 2021

(54) NETWORK HUB, TRANSFER METHOD, AND ONBOARD NETWORK SYSTEM

(71) Applicant: Panasonic Intellectual Property Corporation of America, Torrance, CA (US)

(72) Inventors: Manabu Maeda, Osaka (JP); Takamitsu Sasaki, Osaka (JP); Tomoyuki Haga, Nara (JP); Hideki Matsushima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 233 days.

(21) Appl. No.: 16/166,374

(22) Filed: Oct. 22, 2018

(65) Prior Publication Data
US 2019/0058611 A1 Feb. 21, 2019

Related U.S. Application Data

(63) Continuation of application No. PCT/JP2017/015817, filed on Apr. 20, 2017.
(Continued)

(30) Foreign Application Priority Data

Mar. 10, 2017 (JP) .............................. JP2017-046322

(51) Int. Cl.
*H04L 12/40* (2006.01)
*H04L 12/66* (2006.01)
(Continued)

(52) U.S. Cl.
CPC .............. *H04L 12/40* (2013.01); *H04L 12/28* (2013.01); *H04L 12/2801* (2013.01);
(Continued)

(58) Field of Classification Search
CPC ..... H04L 12/40; H04L 12/28; H04L 12/2801; H04L 12/40071; H04L 12/46;
(Continued)

(56) References Cited

U.S. PATENT DOCUMENTS 6,654,355 B1 11/2003 Marbach et al.
2015/0003443 A1 1/2015 Koenigseder et al.

FOREIGN PATENT DOCUMENTS

EP 3346646 7/2018
JP 2006-221286 8/2006
(Continued)

OTHER PUBLICATIONS

The Extended European Search Report from the European Patent Office (EPO) dated Apr. 24, 2019 for the related European Patent Application No. 17802503.7.
(Continued)

*Primary Examiner* — Ian N Moore
*Assistant Examiner* — Brian T Le
(74) *Attorney, Agent, or Firm* — Greenblum & Bernstein, P.L.C.

(57) ABSTRACT

A network hub is provided for an onboard network system. The onboard network system includes first and second networks for transmission of first-type and second-type frames following first and second communication protocols. The network hub includes a receiver that receives a first-type frame. A processor determines whether or not the first-type frame received by the receiver includes first information that is a base for a second-type frame to be transmitted to the second network, to obtain a determination result, and selects a port to send a frame based on the first-type frame based on the determination result. A transmitter sends the frame based on the first-type frame to a wired transmission path con-
(Continued)

nected to the port selected by the processor based on the first-type frame received by the receiver.

13 Claims, 18 Drawing Sheets

Related U.S. Application Data

(60) Provisional application No. 62/342,562, filed on May 27, 2016.

(51) Int. Cl.
  *H04L 29/06* (2006.01)
  *H04L 12/28* (2006.01)
  *H04L 12/46* (2006.01)
  *H04L 29/08* (2006.01)
  *H04L 12/44* (2006.01)
  *H04L 29/12* (2006.01)

(52) U.S. Cl.
  CPC ........ *H04L 12/40071* (2013.01); *H04L 12/46* (2013.01); *H04L 12/4625* (2013.01); *H04L 12/66* (2013.01); *H04L 67/12* (2013.01); *H04L 69/08* (2013.01); *H04L 69/16* (2013.01); *H04L 69/18* (2013.01); *H04L 61/6022* (2013.01); *H04L 61/6027* (2013.01); *H04L 2012/40215* (2013.01); *H04L 2012/40273* (2013.01); *H04L 2012/445* (2013.01)

(58) Field of Classification Search
  CPC ..... H04L 12/4625; H04L 12/66; H04L 67/12; H04L 69/16; H04L 69/18; H04L 61/6022; H04L 61/6027; H04L 2012/40215; H04L 2012/40273; H04L 2012/445
  See application file for complete search history.

(56) References Cited

FOREIGN PATENT DOCUMENTS

| | | |
|---|---|---|
| JP | 2014-027406 | 2/2014 |
| JP | 2015-139093 | 7/2015 |
| JP | 2016-111477 | 6/2016 |

OTHER PUBLICATIONS

International Search Report of PCT application No. PCT/JP2017/015817 dated Jul. 25, 2017.

Mitsuhiro Kitani et al., "Development of Data Communication Method In-Vehicle Network for Automated Driving", IPSJ SIG Technical Report, vol. 2016-GN-97, No. 21, Jan. 21, 2016, pp. 1-8 (Partial Translation).

| DATA TYPE | TRANSMISSION DESTINATION ECU TYPE | DESTINATION MAC ADDRESS/CAN-ID |
|---|---|---|
| STEERING INSTRUCTION ANGLE | C-ECU | 0x123 |
| SPEED INSTRUCTION VALUE | C-ECU | 0x234 |
| CURRENT SPEED VALUE | C-ECU | 0x345 |
| CURRENT SPEED VALUE | E-ECU | 00:11:22:33:44:55, 00:12:34:56:78:90 |
| COMMUNICATION INFORMATION | E-ECU | 00:12:23:34:45:56 |
| ... | ... | ... |

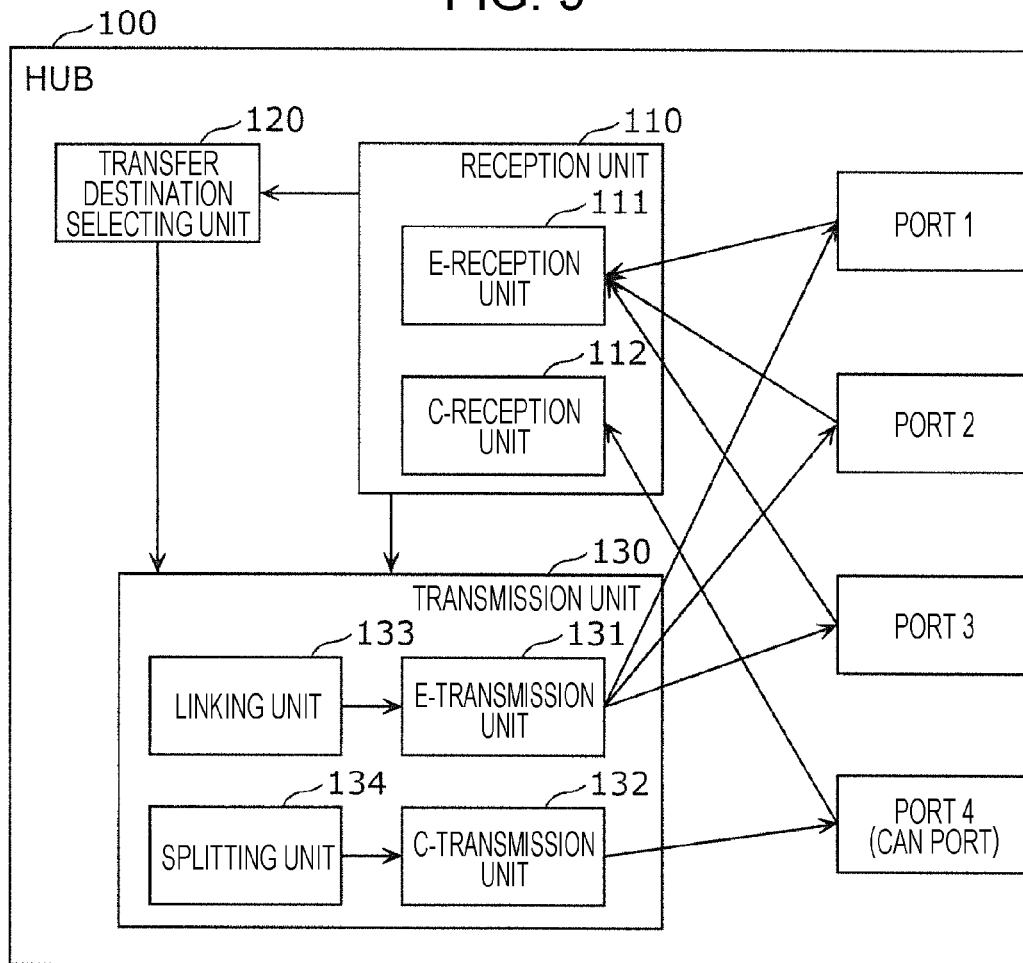

| TRANSMISSION SOURCE | CAN-ID | DESTINATION |
|---|---|---|
| MAC ADDRESS 1 | 0x123 | CAN PORT 1 |
| MAC ADDRESS 1 | 0x234 | CAN PORT 2 |
| MAC ADDRESS 2 | * | CAN PORT 1, CAN PORT 2 |
| CAN PORT 1 | 0x345, 0x456 | CAN PORT 2 |
| ... | ... | ... |

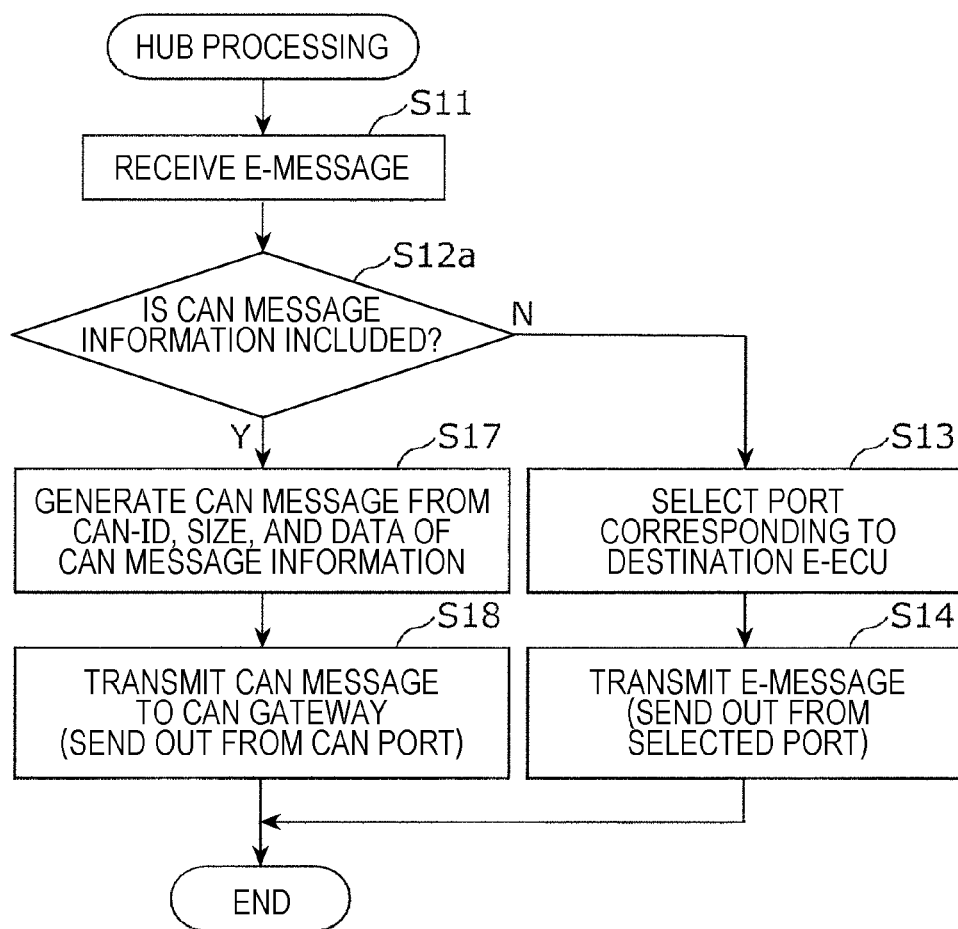

| MAC ADDRESS | CAN-ID |
|---|---|
| 02:aa:bb:cc:01:23 | 0x123 |
| 02:aa:bb:cc:02:34 | 0x234 |
| 02:aa:bb:cc:03:45 | 0x345 |
| 02:aa:bb:cc:04:56 | 0x456 |

| INDIVIDUAL DATA POSITION | CAN-ID | SIZE |
|---|---|---|
| SECOND Byte | 0x123 | 2 |
| FIRST Byte | 0x234 | 1 |
| FOURTH Byte | 0x345 | 4 |
| EIGHTH Byte | 0x456 | 1 |

US 10,951,436 B2

NETWORK HUB, TRANSFER METHOD, AND ONBOARD NETWORK SYSTEM

BACKGROUND

1. Technical Field

The present disclosure relates to technology for transferring messages among electronic control units that communicate over an onboard network.

2. Description of the Related Art

Japanese Unexamined Patent Application Publication No. 2016-111477 describes a gateway that relays messages among device conforming to the CAN protocol and device conforming to the Ethernet (registered trademark) protocol and so forth.

SUMMARY

Further improvement has been needed with the above related art.

In one general aspect, the techniques disclosed here feature a network hub for an onboard network system. The onboard network system includes a first network for transmission of a first-type frame following a first communication protocol, and includes a second network for transmission of a second-type frame following a second communication protocol that is different from the first communication protocol. The network hub includes a receiver that receives the first-type frame, a processor that determines whether or not the first-type frame received by the receiver includes first information that is a base for the second-type frame to be transmitted to the second network, to obtain a determination result, and selects a port to send a frame based on the first-type frame based on the determination result, and a transmitter that sends the frame based on the first-type frame to a wired transmission path connected to the port selected by the processor based on the first-type frame received by the receiver.

According to the present disclosure, further improvement can be realized.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 9 is a configuration diagram of a network hub according to the first embodiment;

FIG. 10 is a diagram illustrating an example of a MAC (Media Access Control) address table used at the hub according to the first embodiment;

FIG. 22 is a flowchart illustrating an example of operations of the hub according to the fourth embodiment;

FIG. 23 is a diagram illustrating an example of an addressee table used at an E-ECU according to a fifth embodiment;

DETAILED DESCRIPTION

Figure 1:
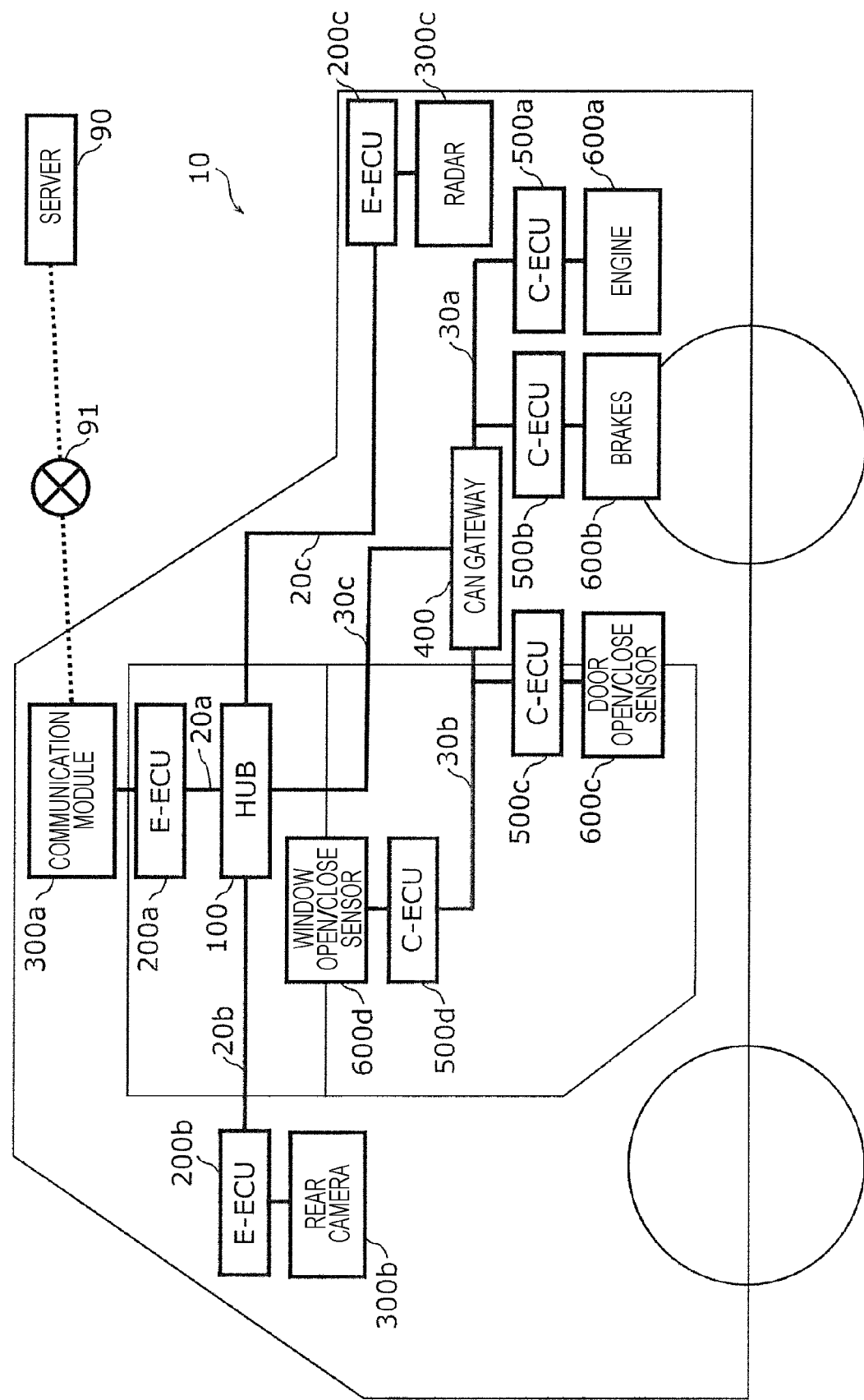
FIG. 1 is a diagram illustrating an overall configuration of an onboard network system according to a first embodiment.

Underlying Knowledge Forming Basis of the Present Disclosure

In recent years, a great number of devices called electronic control units (ECU) have been placed in systems in automobiles. A network connecting these ECUs is referred to as an onboard network. Many standards exist for onboard networks. One of the most mainstream of these onboard networks is a standard called Controller Area Network (CAN), that is stipulated in ISO11898-1. In CAN, ECUs (nodes) connected to a bus that is a wired transmission path (communication path) exchange frames (messages). There are no identifiers indicating transmission destinations or transmission sources in CAN. A transmitting node appends an ID (CAN-ID) to each frame and transmits (i.e., sends signals out onto the bus), and the receiving nodes receive (i.e., read signals from the bus) only of messages of CAN-IDs set beforehand. There is a standard called Ethernet (registered trademark) stipulated by IEEE 802.3, as a standard to transmit a greater amount of information. A frame (message) in Ethernet (registered trademark) includes information indicating a transmission destination and a transmission source, in the header. The maximum amount of data that can be transmitted by one frame is greater in Ethernet (registered trademark) as compared to CAN.

In an onboard network including an Ethernet (registered trademark) network and a CAN network, each of the ECUs that communicate with other electronic control units will have an interface for at least one of Ethernet (registered trademark) and CAN. In this case, an arrangement where each of the electronic control units that need to perform communication with electronic control units having an Ethernet (registered trademark) interface and also perform communication with electronic control units connected to the CAN bus (i.e., electronic control units having a CAN interface) have both interfaces has problems such as increased costs and so forth. Accordingly, an arrangement is desirable where electronic control units having only an Ethernet (registered trademark) interface can transmit information to electronic control units connected to the CAN bus via a gateway or the like. Note that Japanese Unexamined Patent Application Publication No. 2016-111477 makes no mention of transmission path sorting regarding whether a message transmitted by an electronic control unit having an Ethernet (registered trademark) interface (hereinafter, also referred to as "E-ECU") will be transmitted to another E-ECU, or will be transmitted to an electronic control unit connected to the CAN bus (hereinafter also referred to as "C-ECU"), and so forth.

The present Inventors have conceived the embodiments of the present disclosure based on the above-described consideration.

A network hub according to an aspect of the present disclosure is a network hub for an onboard network system including a first network for transmission of a first-type frame following a first communication protocol, and including a second network for transmission of a second-type frame following a second communication protocol that is different from the first communication protocol. The network hub includes a receiver that receives the first-type frame, a processor that determines whether or not the first-type frame received by the receiver includes first information that is a base for the second-type frame to be transmitted to the second network, to obtain a determination result, and selects a port to send out a frame based on the first-type frame, based on the determination result, and a transmitter that sends the frame based on the first-type frame to a wired transmission path connected to the port selected by the processor based on the first-type frame received by the receiver. Accordingly, the port to send out the frame is selected by the hub relaying the frame (message) according to whether first information is present or absent, so transmission of information to an ECU (e.g., a C-ECU) connected to the bus of the second network such as CAN or the like, by an ECU (e.g., an E-ECU) connected to the first network such as Ethernet (registered trademark) or the like, can be performed appropriately. Note that the transmission source ECU of the first-type frame (e.g., an E-ECU) is an ECU connected to the first network in an onboard network system including the first network for transmission of first-type frames following the first communication protocol (e.g., Ethernet (registered trademark) protocol) and the second network for transmission of second-type frames following the second communication protocol (e.g., CAN protocol) that is different from the first communication protocol, and includes a generating unit that generates a first-type frame following the first communication protocol, and a transmission unit that transmits the first-type frame generated by the generating unit to the first network. The generating unit performs the generating of the first-type frame by including first information as a base for the second-type frame to be transmitted to the second network, and second information indicating that the first-type frame includes information to be transmitted to the second network, in the first-type frame, An arrangement may be made where the first communication protocol is an Ethernet (registered trademark) protocol, the second communication protocol is a CAN protocol, the first-type frame is an Ethernet (registered trademark) frame including an Ethernet (registered trademark) header and data that is a payload, the second-type frame is a data frame including a data field, the first information indicates content of the data field, and the network hub includes a first port connected to an Ethernet (registered trademark) cable. An E-ECU that only has an Ethernet (registered trademark) interface, for example, can appropriately transmit information to a C-ECU connected to a CAN bus, by frames being relayed by this hub.

An arrangement may be made where the network hub further includes a second port connected to the second network over which the second-type frame is to be transmitted. The processor selects the second port connected to the second network as the port to send the frame based on the first-type frame, in a case of determining that the first-type frame received by the receiver includes the first information, and selects the first port connected to the Ethernet (registered trademark) cable as the port to send out the frame based on the first-type frame, in a case of determining that the first-type frame received by the receiver does not include the first information. The transmitter sends a first-type frame, of which at least a content of a payload is same as the first-type frame, to the Ethernet (registered trademark) cable, in the case where the port selected by the processor based on the first-type frame received by the receiver is the first port to which the Ethernet (registered trademark) cable is connected, and sends a second-type frame including the first information in the first-type frame, in the case where the port selected by the processor based on the first-type frame received by the receiver is the second port connected to the second network. Accordingly, the hub sends out a frame based on the frame received from the Ethernet (registered trademark) cable, directly to the CAN bus under a predetermined condition, thereby doing away with the need to provide another conversion device or the like having protocol conversion functions.

An arrangement may be made where the second-type frame includes an ID field, a data length code (DLC), and the data field, the first information indicates the ID field, the DLC, and a value of the data field, and the transmitter sends the second-type frame to the second network with a value of the ID field, indicated by the first information, in the ID field of the second-type frame, a value of the DLC, indicated by the first information, in the DLC of the second-type frame, and the value of the data field, indicated by the first information, in the data field of the second-type frame. Accordingly, the hub generates a CAN message following first information that the E-ECU has included in the first-type frame, and sends out to the CAN bus, so an E-ECU can transmit any CAN message to a C-ECU.

An arrangement may be made where the first information further indicates values of the ID field, the DLC, and the data field for each of a plurality of second-type frames to be transmitted to the second network, and the transmitter sends the second-type frame to the second network by sending the plurality of second-type frames, each of which includes a different part of the first information. Accordingly, transmission efficiency can be improved in a case of transmitting information from an E-ECU to a C-ECU.

An arrangement may be made where the second-type frame includes an ID field and the data field, wherein the first information is a set of individual data indicating values of the data field for each of a plurality of second-type frames to be transmitted to the second network, included in the payload of the first-type frame, and the transmitter sends the second-type frame to the second network with, with regard to the set of the individual data, an ID value identified based on placement of individual data in the payload, in the ID field of the second-type frame, and a value of the individual data in the data field of the second-type frame. Accordingly, this does away with the need for the E-ECU to include a CAN-ID in the first-type frame.

An arrangement may be made where the second-type frame includes an ID field and the data field, and the transmitter sends the second-type frame including the first information in the first-type frame received by the receiver to the second network with an ID value, identified based on a value of a destination MAC address in the Ethernet (registered trademark) header within the first-type frame, in the ID field of the second-type frame, and a value of the data field that the first information indicates in the data field of the second-type frame. Accordingly, this does away with the need for the E-ECU to include a CAN-ID in the payload of the first-type frame.

The network hub may further include a plurality of ports connected to the Ethernet (registered trademark) cable, the plurality of ports including a second port connected to a device connected to the second network over which the second-type frame is to be transmitted by the Ethernet (registered trademark) cable. In a case where the first-type frame received by the receiver is determined to include the first information, the processor may select the second port connected to the device connected to the second network by the Ethernet (registered trademark) cable, as the port to send the frame based on the first-type frame, and the transmitter may send a first-type frame, of which at least a content of a payload is same as the first-type frame, to the Ethernet (registered trademark) cable connected to the second port selected by the processor based on the first-type frame received by the receiver. Accordingly, information to be transmitted form an E-ECU to a C-ECU can be sent out to a relay device (a separate hub or the like) connected to the bus to which the C-ECU is connected.

The processor determines the determination result by a value of a predetermined identification flag within the first-type frame received by the receiver. Accordingly, the hub sorts transmission paths of information in accordance with identification flags, so the E-ECU can transmit information to an intended ECU by appropriately setting the identification flag in the first-type frame.

The predetermined identification flag may be within the Ethernet (registered trademark) header of the first-type frame. Accordingly, this does away with the need for the hub to reference the payload in a case where the destination of the first-type frame is an E-ECU, and selecting of a transmission path for information can be performed relatively speedily.

The processor may determine the determination result by a value of a destination MAC address in the Ethernet (registered trademark) header within the first-type frame received by the receiver. Accordingly, this does away with the need for an E-ECU to provide an identification flag indicating that information is addressed to a C-ECU, in the payload of a first-type frame to be transmitted or the like. Accordingly, the amount of data of the first-type frame can be reduced.

A transfer method according to an aspect of the present disclosure is a transfer method for a network hub in an onboard network system including a first network for transmission of first-type frames following a first communication protocol and including a second network for transmission of second-type frames following a second communication protocol that is different from the first communication protocol. The transfer method includes receiving a first-type frame; selecting a transfer destination by a processor, by determining whether or not the first-type frame received in the receiving includes first information that is a base for a second-type frame that is to be transmitted to the second network, and selecting a port for sending out a frame based on the first-type frame according to a determination result; and transmitting the frame based on the first-type frame to a wired transfer path connected to the port selected in the selecting of the transfer destination, based on the first-type frame received in the receiving. Accordingly, transmission of information to an ECU (e.g., a C-ECU) connected to the bus of the second network such as CAN or the like, by an ECU (e.g., an E-ECU) connected to the first network such as Ethernet (registered trademark) or the like, can be performed appropriately.

An onboard network system according to an aspect of the preset disclosure is a network system including a first network for transmission of first-type frames following a first communication protocol and including a second network for transmission of second-type frames following a second communication protocol that is different from the first communication protocol. The onboard network system includes an electronic control unit connected to the first network, and a network hub connected to the first network. The electronic control unit generates a first-type frame following the first communication protocol; and transmits the generated first-type frame to the first network. The electronic control unit generates the first-type frame by including first information as a base for the second-type frame to be transmitted to the second network, and second information indicating that the first-type frame includes information to be transmitted to the second network, in the first-type frame. The network hub receives the first-type frame; determines whether or not the received first-type frame includes the first information, and selects a port to send a frame based on the received first-type frame, in accordance with a determination result; and sends the frame based on the received first-type frame to a wired transmission path connected to the selected port, based on the received first-type frame. Accordingly, transmission of information to an ECU (e.g., a C-ECU) connected to the bus of the second network such as CAN or the like, by an ECU (e.g., an E-ECU) connected to the first network such as Ethernet (registered trademark) or the like, can be performed appropriately.

It should be noted that these general or specific embodiments may be implemented as a system, a method, an integrated circuit, a computer program, or a computer-readable recording medium such as a CD-ROM, and may be realized by any combination of a system, method, integrated circuit, computer program, and recording medium.

The following is a description of an onboard network system including a network hub and electronic control units (ECU) according to embodiments with reference to the drawings. Note that the embodiments described below are all specific examples of the present disclosure. Accordingly, values, components, placements and connected states of components, steps (processes) and the order of steps, and so forth illustrated in the following embodiments, are only exemplary, and do not restrict the present disclosure. Components in the following embodiments which are not included in an independent Claim are optionally addable components. The drawings are schematic diagrams, and are not necessarily created in an exact manner.

First Embodiment

An onboard network system 10 that includes multiple electronic control units (E-ECUs) that exchange Ethernet (registered trademark) frames (E-messages) following the Ethernet (registered trademark) protocol will be described below with reference to the drawings, as an embodiment of the present disclosure. The onboard network system 10 also includes multiple electronic control units (C-ECUs) that exchange data frames (CAN messages) and so forth following the CAN protocol.

1.1 Overall Configuration of Onboard Network System 10

FIG. 1 illustrates the overall configuration of the onboard network system 10 according to a first embodiment. The onboard network system 10 is a network communication system in a vehicle where various types of devices have been installed, such as control devices, sensors, actuators, user interface devices, and so forth. The onboard network system 10 includes a first network where transmission of Ethernet (registered trademark) frames (E-messages) is performed following the Ethernet (registered trademark) protocol (an Ethernet (registered trademark) network), and a second network where transmission of data frames (CAN messages) is performed over a bus following the CAN protocol (a CAN network).

The onboard network system 10 includes a network hub 100, electronic control units (E-ECUs) 200a through 200c, a CAN gateway 400, electronic control units (C-ECUs) 500a through 500d, various types of devices (communication module 300a, rear camera 300b, radar 300c, engine 600a, brakes 600b, door open/close sensor 600c, and window open/close sensor 600d) connected to the electronic control units (E-ECUs and C-ECUs), cables (Ethernet (registered trademark) cables) 20a through 20c, and busses (CAN busses) 30a through 30c, as illustrated in FIG. 1. The Ethernet (registered trademark) cables 20a through 20c are first network transmission paths, and the busses 30a through 30c are second network transmission paths.

Note that the onboard network system 10 may include many more ECUs besides the E-ECUs 200a through 200c and C-ECUs 500a through 500d. For example, the C-ECUs that are omitted from illustration can be connected to the busses 30a through 30c, besides the C-ECUs 500a through 500d.

The ECUs (E-ECUs and C-ECUs) are devices that include, for example, processors (microprocessors), digital circuits such as memory and so forth, analog circuits, communication circuits, and so forth. The memory is read-only memory (ROM), random access memory (RAM), and so forth, and can store programs (computer programs serving as software) that are executed by processors. The memory may include non-volatile memory. An ECU realized various types of functions by a processor operating in accordance with programs (computer programs), for example. Note that a computer program is configured by combining multiple sets of command codes instructing commands with respect to the processor, to achieve predetermined functions.

The C-ECUs 500a through 500d exchange frames following the CAN protocol. The C-ECUs 500a through 500d are each connected to devices such as the engine 600a, brakes 600b, door open/close sensor 600c, and window open/close sensor 600d, obtain the states of the devices, and transmit data frames representing the states to the second network made up of the bus 30a, bus 30b, and so forth, periodically for example. the C-ECUs 500a through 500d also receive data frames from the busses making up the second network, interpret the data frames, determine whether or not a data frame having a CAN-ID which it should receive, and can control the device connected to the C-ECU in accordance with the data in the data frame (the contents of the data field) as necessary and can generate and transmit data frames as necessary.

The CAN gateway 400 is a type of ECU serving as a gateway (relay device, etc.) connected to the busses 30a through 30c. The CAN gateway 400 has a function of transferring a data frame received from one bus to another bus.

The E-ECUs 200a through 200c have an Ethernet (registered trademark) interface, and connect to an Ethernet (registered trademark) cable. The E-ECUs 200a through 200c transmit or receive Ethernet (registered trademark) frames (E-messages) following the Ethernet (registered trademark) protocol. The E-ECUs 200a through 200c are each connected to a device such as the communication module 300a, rear camera 300b, and radar 300c, perform processing based on information obtained from the devices, and can control devices as necessary, or transmit information to other ECUs as necessary. The communication module 300a is a device that has a function of communicating with a server 90 outside of the vehicle, via an external network 91 such as the Internet or the like. The server 90 is, for example, a computer having function of providing information to the ECUs of the vehicle and so forth.

The hub 100 is an Ethernet (registered trademark) switch (switching hub) connected to the E-ECUs 200a through 200c. The hub 100 is also connected to the bus 30c, and has a function of transferring frames (messages) between the first network and second network. The hub 100 includes digital circuits such as memory, analog circuits, communication circuits, and so forth, for example, and may include a processor.

1.2 Configuration of Onboard Network

Figure 2:
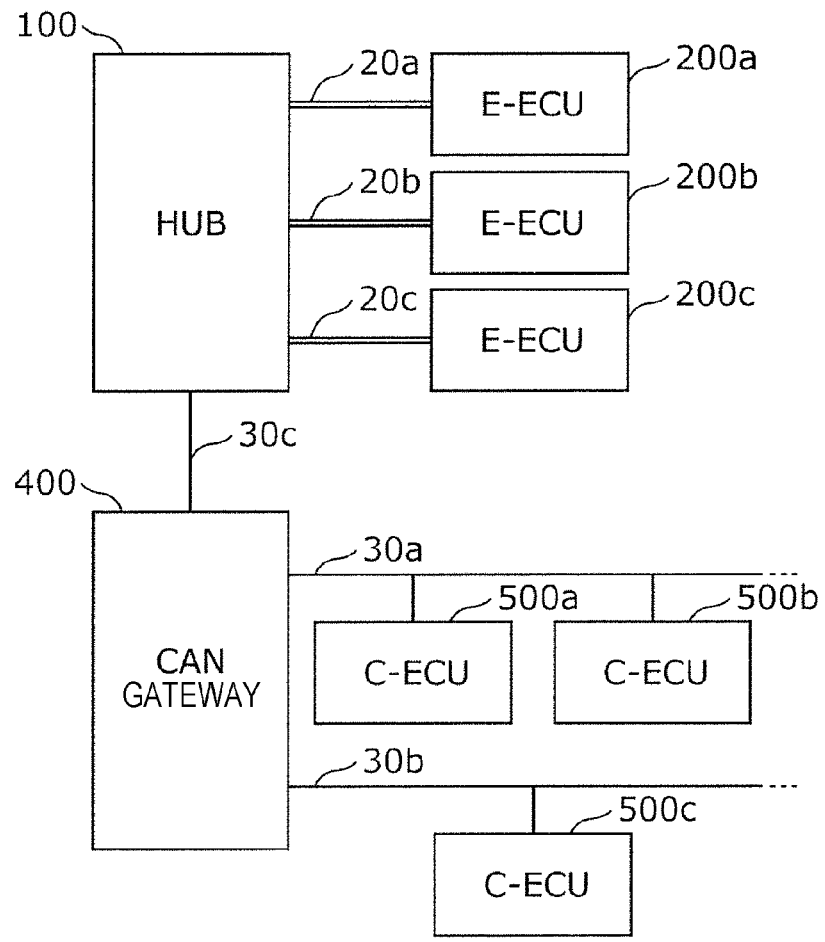
FIG. 2 is a diagram illustrating a schematic configuration of the onboard network according to the first embodiment.

FIG. 2 is a schematic configuration of the onboard network according to the present embodiment. The E-ECUs 200a through 200c can communicate with each other via the first network configured by connecting the cables at the hub 100, in the onboard network system 10. The C-ECUs 500a through 500d also can communicate with each other via the second network configured from the busses 30a and 30b, the CAN gateway 400, and so forth. The E-ECU 200a can communicate with the C-ECU 500a via the cable 20a, hub 100, bus 30c, CAN gateway 400, and bus 30a.

The hub 100 has multiple ports for connecting to E-ECUs (e.g., terminals for connecting Ethernet (registered trademark) cables). The hub 100 also has one port (CAN port) for connecting to the bus 30c connected to the CAN gateway 400.

1.3 Configuration of Frames Exchanged Over Onboard Network

Figure 3:
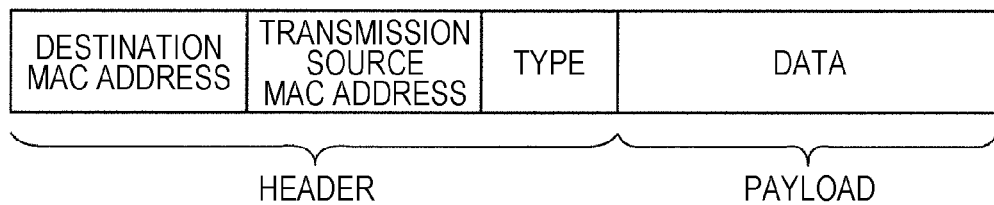
FIG. 3 is a diagram illustrating a format for an Ethernet (registered trademark) frame (also referred to as "E-message") format exchanged at part of the onboard network according to the first embodiment.

FIG. 3 illustrates the format of a frame (E-message) exchanged over the first network. As illustrated in FIG. 3, The E-message is configured by adding a header (Ethernet (registered trademark) header) before a payload that stores data, which is the principal content of transmission. The header includes a destination MAC address, source MAC address, and type.

The E-ECUs in the onboard network system 10 transmit E-messages including CAN message information when transmitting information to be transmitted to a C-ECU. CAN message information is information serving as a base for data frames (CAN message) transmitted over the CAN bus.

Figure 4:
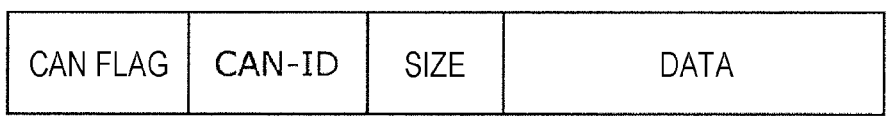
FIG. 4 is a diagram illustrating an example of the configuration of an E-message payload (a configuration including one CAN message information)
Figure 5:
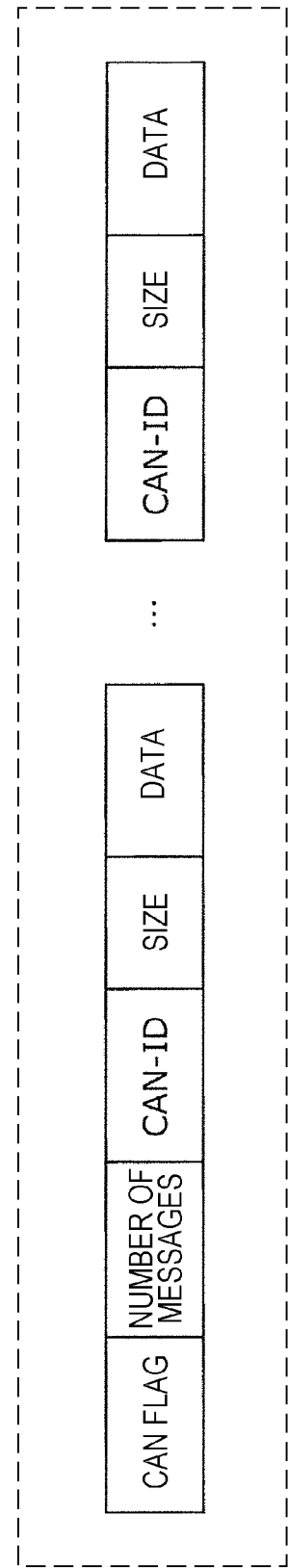
FIG. 5 is a diagram illustrating an example of the configuration of an E-message payload (a configuration including multiple of CAN message information)

A data configuration example within the payload of the E-message illustrated in FIG. 3 is illustrated in FIGS. 4 and 5. FIG. 4 illustrates an example where just one CAN message information is included in the payload of an E-message. FIG. 5 illustrates an example of a case where including multiple CAN message information in the payload of an E-message is enabled.

The CAN message information is made up of a CAN-ID, size, and data, in the example in FIGS. 4 and 5. The number of messages in FIG. 5 indicates the number of CAN message information. Note that information indicating the data amount of the entire CAN message information or the like may be used instead of the number of messages. A CAN flag is an identification flag for identifying whether or not an E-message includes information to be transmitted to the second network, and is a flag that is set to ON in a case where CAN message information is included in the payload of an E-message (i.e., in a case where the ECU that is the destination of the E-message is a C-ECU), and other wise is set to OFF (i.e., a value indicating information opposite to ON). Although the examples in FIGS. 4 and 5 illustrate an example where a CAN flag is situated at the head of the payload of the E-message, this is only an example. An arrangement where multiple CAN message information can be included in an E-message, as in FIG. 5, will be primarily described in the present embodiment. This enables transmission efficiency to be improved, for example.

Note that in a case of an E-ECU transmitting information to be transmitted to an E-ECU but there is no need to transmit to a C-ECU, CAN message information does not have to be included in the contents of the payload of the E-message. In this case, if whether the destination of the E-message is a C-ECU or not can only be determined by the CAN flag or the like, the E-ECU sets the CAN flag (see FIGS. 4 and 5) in the payload of the E-message that does not need to be transmitted to a C-ECU to OFF, for example.

The C-ECUs 500a through 500d and so forth exchange frames following the CAN protocol in the second network. Frames in the CAN protocol include data frames, remote frames, overload frames, and error frames. Data frames will be described with primary focus here.

Figure 6:
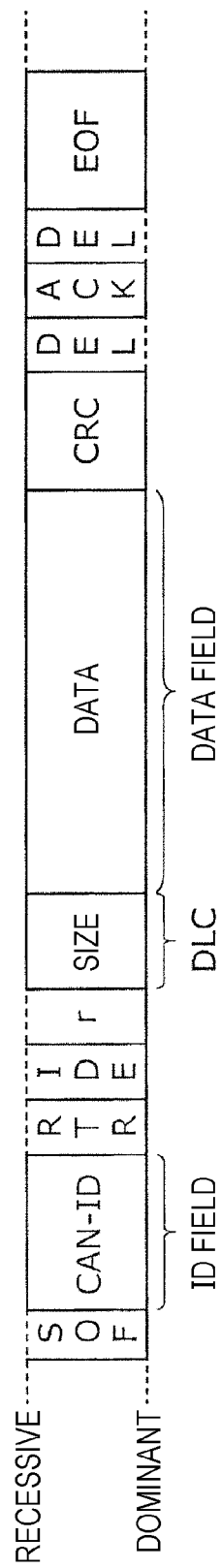
FIG. 6 is a diagram illustrating the format of a data frame stipulated by the CAN protocol.

FIG. 6 illustrates the format of a data frame (CAN message) exchanged over the second network. A data frame includes a start of frame (SOF), ID (CAN-ID), remote transmission request (RTR), identifier extension (IDE), reserved bit "r", size data, cyclic redundancy check (CRC) sequence, CRC delimiter "DEL", acknowledgement (ACK) slot, ACK delimiter "DEL", and end of frame (EOF), as illustrated in FIG. 6. The ID (CAN-ID) serving as the content of the ID field is an identifier indicating the type of data, and also is referred to as a message ID. Note that in CAN, in a case where multiple nodes start transmission at the same time, communication arbitration is performed, where a frame having the smallest CAN-ID value is given priority. Size is a data length code (DLC) indicating the length of the following data field (data). The data specification is not stipulated in the CAN protocol, and is set in the onboard network system 10. Accordingly, the specification can be dependent on the model of the vehicle, the manufacturer (automaker), or the like.

1.4 Configuration of E-ECU

Figures 7, 8:
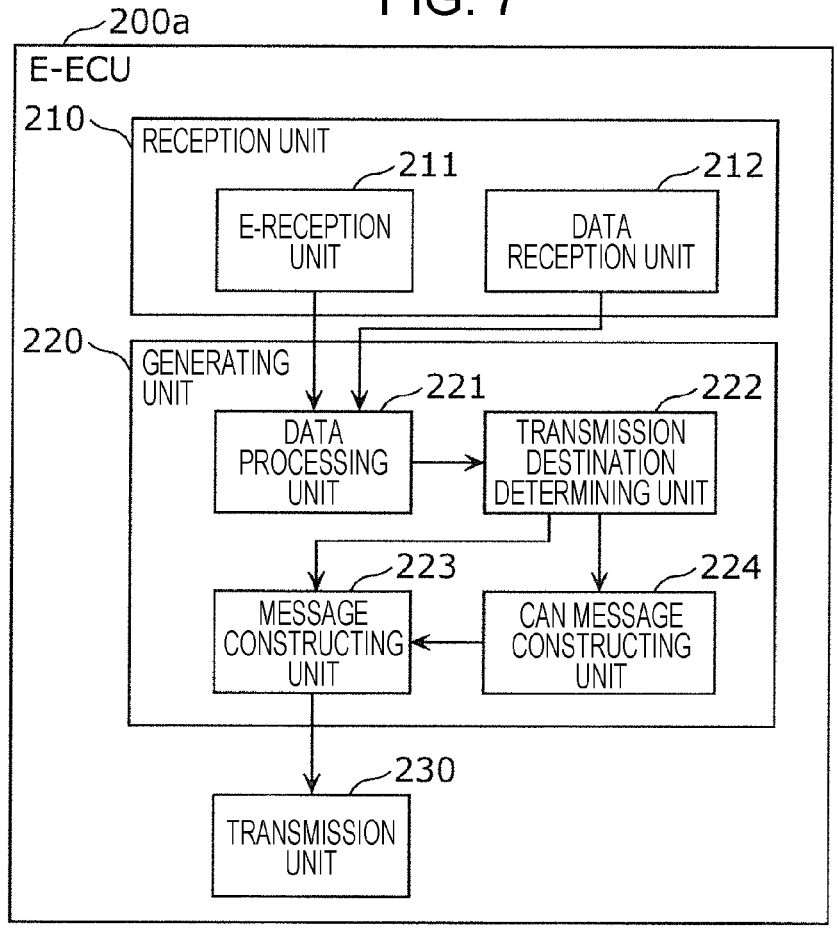
FIG. 7 is a configuration diagram of an electronic control units (E-ECU) according to the first embodiment.
FIG. 8 is a diagram illustrating an example of an addressee table used by the E-ECU according to the first embodiment.

FIG. 7 is a configuration diagram of the E-ECU 200a. The E-ECU 200a is configured including a reception unit 210, a generating unit 220, and a transmission unit 230. These components are realized by communication circuits in the E-ECU 200a, a processor or digital circuits executing programs stored in the memory, and so forth.

The reception unit 210 receives external information, i.e., information from outside of the E-ECU 200a. The reception unit 210 includes an E-reception unit 211 and a data reception unit 212. The E-reception unit 211 receives frames (E-messages) via the cable 20a. The data reception unit 212 receives data from a device to which it is connected (communication module 300a).

The generating unit 220 generates E-messages following the Ethernet (registered trademark) protocol. The generating unit 220 includes a data processing unit 221, a transmission destination determining unit 222, a message constructing unit 223, and a CAN message constructing unit 224.

The data processing unit 221 performs information processing (computation, etc.) based on external information (data or E-message) received by one or both of the E-reception unit 211 and data reception unit 212, and generates various types of information to be transmitted to other ECUs. The data processing unit 221 may use external information itself as the generated various types of information. The information processing by the data processing unit 221 may be any information processing, and the information generated by the data processing unit 221 may be any information. The various types of information that the data processing unit 221 generates is information for traveling control of the vehicle, information to be presented to the user of the vehicle, or the like, for example, and is classified into multiple types (data types) such as steering instruction angles, speed instruction values, current speed value, communication information, and so forth, for example.

The transmission destination determining unit 222 determines a transmission destination using an addressee table for example, in accordance with the data type of the information that the data processing unit 221 has generated. FIG. 8 illustrates an example of the addressee table that the transmission destination determining unit 222 uses. The addressee table exemplarily illustrated in FIG. 7 is a table correlating the transmission destination type, which indicates whether the ECU that is the destination of the information is an E-ECU or a C-ECU, and a destination MAC address (or CAN-ID), for each data type of information. The In a case of having determined that the transmission destination of the information that the data processing unit 221 has generated is a C-ECU, the transmission destination determining unit 222 sets a CAN-ID based on the addressee table and notifies the CAN message constructing unit 224. The transmission destination determining unit 222 also sets a destination MAC address that is to be the transmission destination of the information generated by the data processing unit 221, using the addressee table, and notifies the E-message constructing unit 223. Note that in a case where the transmission destination is multiple E-ECUs, the transmission destination determining unit 222 notifies the E-message constructing unit 223 of the destination MAC addresses of each transmission destination. In a case of having determined that the transmission destination is a C-ECU, the transmission destination determining unit 222 sets a particular address decided beforehand as the destination MAC address, and notifies the message constructing unit 223. Examples of a particular address include a broadcast address, multicast address, MAC address of a device (converter) having protocol conversion functions, and so forth. Note that the hub 100 may have a MAC address although the hub 100 does not need to have a MAC address, and in a case where the hub 100 has a MAC address, that MAC address may be the above-described particular address.

The CAN message constructing unit 224 generates CAN message information based on the notified CAN-ID, the data indicating the information that the data processing unit 221 has generated, and the size of that data. For example, in a case where the data indicating the information that the data processing unit 221 has generated exceeds the maximum data length of a CAN message, the CAN message constructing unit 224 generates multiple CAN message information by splitting the data indicating that information. The CAN message information generated by the CAN message constructing unit 224 is placed in an E-message by the E-message constructing unit 223, and the E-message is transmitted by the transmission unit 230. As long as the CAN message information generated by the CAN message constructing unit 224 includes information indicating at least the data of the CAN message (the content of the data field of the data frame), other contents and formats are optional. However, configuring the CAN message information so that the bit length of the CAN-ID, size, and data, follow the CAN protocol as illustrated in FIG. 6, is useful. Also useful is the CAN message constructing unit 224 constructing the CAN message information to match the CAN message format in accordance with the CAN protocol, for example, so that a device such as the hub 100 or the like can efficiently convert into CAN messages during the process of transmission of an E-message including CAN message information to be transmitted to a C-ECU.

For every destination MAC address notified to the transmission destination determining unit 222, the E-message constructing unit 223 constructs an E-message including that destination MAC address and the MAC address of the E-ECU 200*a* serving as a source MAC address (see FIG. 3). If the transmission destination is a C-ECU for example, the E-message constructing unit 223 includes the CAN flag set to ON, the number of CAN message information constructed by the CAN message constructing unit 224, and each CAN message information in the payload of the E-message (see FIG. 5). If the transmission destination is an E-ECU for example, the E-message constructing unit 223 includes the CAN flag set to OFF, and data indicating the information that the data processing unit 221 has generated, in the payload of the E-message. Note that in a case where the information generated by the data processing unit 221 is a plurality, the E-message constructing unit 223 may link the multiple CAN message information that can have different CAN-IDs from each other, that have been generated by the CAN message constructing unit 224, and place in the payload of the E-message.

In a case where a need has arisen to transmit CAN message information to a C-ECU based on external information (data or E-message) received from one or both of the E-reception unit 211 and data reception unit 212 as described above, the generating unit 220 generates an E-message storing the CAN message information and a CAN flag set to ON. The CAN flag set to ON is used as second information indicating that the E-message indicates first information (CAN message information that is the base for a CAN message) that is to be transmitted to the second network. Also, in a case where a need has arisen to transmit information to an E-ECU based on the external information, the generating unit 220 generates an E-message including the information to be transmitted, but not including the second information (e.g., the CAN flag is set to OFF), for example. The transmission unit 230 sends the E-message generated by the generating unit 220 out onto the cable 20*a*, thereby transmitting to the first network. Also note that the E-ECUs 200*b* and 200*c* also have the same configuration as the above-described E-ECU 200*a*.

1.5 Configuration of Hub 100

FIG. 9 is a configuration diagram of the hub 100. The hub 100 has ports 1 through 4. The ports 1 through 3 are respectively connected to the cables 20*a* through 20*c* making up the first network. The port 4 is a CAN port where the bus 30*c* making up the second network (i.e., the wired transmission path connected to the CAN gateway 400) is connected. The hub 100 is configured including a reception unit 110, a transfer destination selecting unit 120, and a transmission unit 130. These components are realized by communication circuits in the hub 100, digital circuits (or a processor executing programs stored in the memory), and so forth.

The reception unit 110 includes an E-reception unit 111 that receives E-messages from the ports 1 through 3, and a C-reception unit 112 that receives CAN messages from the port 4.

The transfer destination selecting unit 120 determines whether or not an E-message received by the reception unit 110 includes first information (CAN message information) that is the base of a CAN message (data frame) to be transmitted to the second network, and selects the port for sending out the frame based on the E-message, in accordance with the results of the determination. That is to say, in a case where the E-message received at the reception unit 110 does not include CAN message information, the transfer destination selecting unit 120 selects, based on the destination MAC address in the header of that E-message, one of ports 1 through 3 as the destination for sending out an E-message having the same contents as that E-message. The transfer destination selecting unit 120 selects a port by referencing a MAC address table. FIG. 10 illustrates an example of a MAC address table used by the transfer destination selecting unit 120. The MAC address table is generated and updated by the hub 100 serving as a switch (switching hub) learning MAC addresses by reception of E-messages from each of the ports 1 through 3. The above-described particular address, for example, may be set as the destination MAC address relating to the port 4 (CAN port) in the MAC address table. Note that an arrangement may be made where, in a case where whether or not an E-message contains CAN message information can be determined by the CAN flag placed in the payload, information of the port 4 (CAN port) is not included in the MAC address table. In a case where the E-message received by the reception unit 110 includes CAN message information, the transfer destination selecting unit 120 selects the port 4 (CAN port) as the sending destination of the CAN message (data frame) configured to indicate that CAN message information, regardless of whether the determination is made based on the destination MAC address of the E-message or based on the CAN flag in the E-message.

The transmission unit 130 includes an E-transmission unit 131, a C-transmission unit 132, a linking unit 133, and a splitting unit 134. The E-transmission unit 131 has a function of transmitting E-messages from the ports 1 through 3, and the C-transmission unit 132 has a function of transmitting a CAN message in accordance from the CAN protocol from the port 4. The linking unit 133 has a function of linking information regarding multiple CAN message received at the C-reception unit 112 to generate an E-message for transmission, and hand this to the E-transmission unit 131. The splitting unit 134 has a function of, in a case where the payload of an E-message received at the E-reception unit 111 contains multiple CAN message information that have been linked (see FIG. 5) or the like, splitting into each individual CAN message information of the number indicated by the number of messages in FIG. 5 for example, and generating and sequentially transmitting CAN messages following the CAN protocol in accordance with each CAN message information to the C-transmission unit 132. The order of transmission in this case, i.e., the transmission order of the CAN messages to be transmitted at the C-transmission unit 132, follows the order of array of the CAN message information in the payload of the E-message serving as the base thereof, for example. According to these configurations, the transmission unit 130 sends out a frame (an E message in a case where any one of ports 1 through 3 has been selected, and a CAN message in a case where port 4 has been selected) based on the received E-message, to the wired transmission path (one of cables 20a through 20c and bus 30c) connected to the port selected at the transfer destination selecting unit 120 with respect to the E-message received at the reception unit 110. That is to say, in a case where the port selected by the transfer destination selecting unit 120 with respect to the E-message received at the reception unit 110 is any one of ports 1 through 3, the transmission unit 130 sends out an E-message of which at least the contents of the payload are the same as that E-message to the cable connected to the selected port. In a case where the port selected by the transfer destination selecting unit 120 with respect to the E-message received at the reception unit 110 is port 4 (CAN port) connected to the bus 30c, the transmission unit 130 sends out a CAN message including the first information (CAN message information) in that E-message to the bus 30c. In detail, the transmission unit 130 sends out a CAN message to the bus 30c by placing the ID (i.e., the value of the ID field) of the first information (CAN message information) in the E-message that the hub 100 has received into the ID field of the CAN message, placing the size that the first information indicates (i.e., value of DLC) into the DLC of the CAN message, places data that the first information indicates (i.e., values in the data field) into the data field of the CAN message, and sending out the generated CAN message to the bus 30c. Also, in a case where an E-message that the hub 100 has received has first information including multiple CAN message information in the payload, the transmission unit 130 performs sending out of CAN messages to the bus 30c by sequentially sending out each of the multiple CAN messages including parts different from each other in the first information (individual CAN message information) in the E-message that the hub 100 has received. Note that the hub 100 may have functions to generate E-messages based on CAN messages received at the C-reception unit 112, and transmit from one of the ports 1 through 3.

1.6 Operations of E-ECU

Figure 11:
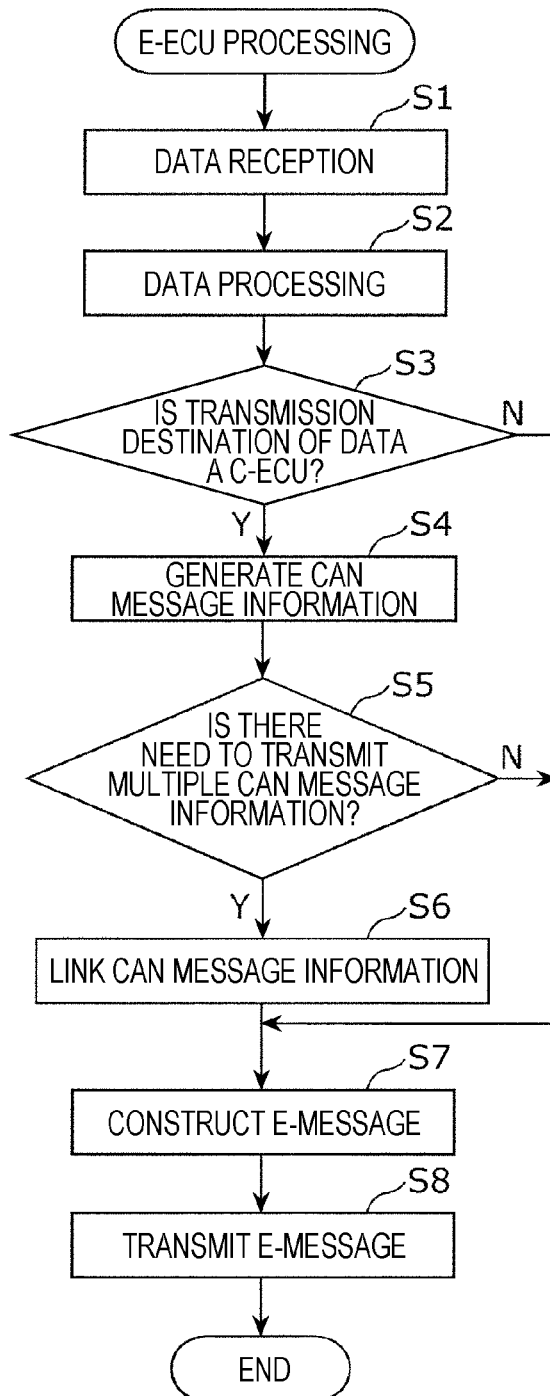
FIG. 11 is a flowchart illustrating an example of operations of the E-ECU according to the first embodiment.

FIG. 11 is a flowchart illustrating E-ECU processing, as an example of operations of an E-ECU according to the present embodiment. E-ECU processing executed by the E-ECU 200a will be described below by way of FIG. 11.

The E-ECU 200a receives external information (an E-message from another E-ECU, data from the communication module 300a, etc.) from the reception unit 210 (step S1).

Next, based on the external information that has been received, the E-ECU 200a performs data processing (generating various types of information to be transmitted to another ECU, etc.) at the data processing unit 221 (step S2).

The ECU 200a then determines, regarding each information generated by the data processing unit 221, whether the transmission destination of the information is a C-ECU or not in accordance with the data type of the information, using an addressee table (step S3). In a case of having determined that the transmission destination of the information is a C-ECU, the E-ECU 200a sets a CAN-ID in accordance with the data type of the information, and generates CAN message information indicating the CAN-ID, the data indicating the information generated by the data processing unit 221, and the size of the data, using the CAN message constructing 224 (step S4). Note that in a case where the data indicating the information generated by the data processing unit 221 exceeds the maximum data length of a CAN message, the data is split, and multiple CAN message information are generated, as described earlier.

The E-ECU 200a also determines whether or not there is a need to transmit multiple CAN message information (step S5), and if there is that need, joins (links) each of the CAN message information generated in step S4 (step S6). In a case where multiple CAN message information have been generated by splitting data indicating the information generated by the data processing unit 221, or in a case where the data processing unit 221 has generated multiple information, determination is made in step S5 that there is a need to transmit multiple CAN messages. The E-ECU 200a skips step S6 in a case of having determined that there is no need to transmit multiple CAN messages.

In a case of having determined in step S3 that the transmission destination is a C-ECU, the E-ECU 200a constructs an E-message including one CAN message information generated in step S4, or multiple CAN message information linked in step S6, in the payload, using the message constructing unit 223 (step S7). In a case where the E-ECU 200a has determined in step S3 that the transmission destination is not a C-ECU, in step S7 an E-message including the data indicating the information generated by the data processing unit 221 in the payload is constructed by the message constructing unit 223. As one example, in step S7 the E-ECU 200a generates an E-message storing in the payload thereof the CAN message information to be transmitted to a C-ECU and a CAN flag set to ON, or an E-message storing in the payload thereof the CAN message information to be transmitted to an E-ECU and a CAN flag set to OFF. Note that a destination MAC address set in accordance with the data type of information to be transmitted using the addressee table is set in the header of an E-message of which the transmission destination is not a C-ECU. Also, a destination MAC address indicating the above-described particular address is set in the header of an E-message of which the transmission destination is a C-ECU.

The E-ECU 200a transmits the E-message generated in step S7 to the cable 20a (step S8) by the transmission unit 230. The E-message transmitted by the E-ECU 200a will be received by the hub 100.

Note that the E-ECU 200b and E-ECU 200c can also operate in the same way as the E-ECU 200a.

1.7 Operations of Hub 100

Figure 12:
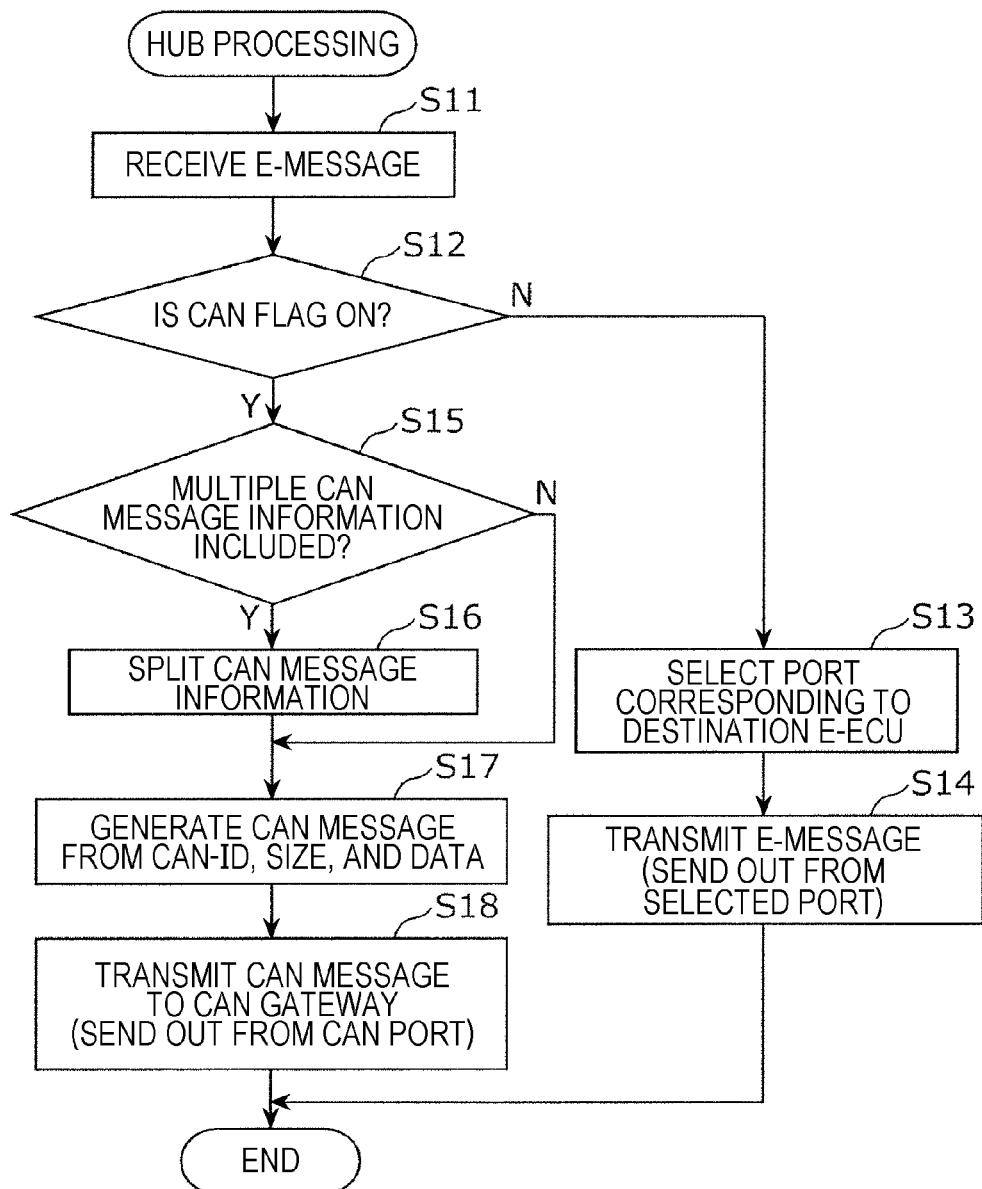
FIG. 12 is a flowchart illustrating an example of operations of the hub according to the first embodiment.

FIG. 12 is a flowchart illustrating hub processing, as an example of operations of the hub 100. hub processing is processing to transfer an E-message in a case of having received an E-message. Transfer of an E-message here is transmission of the same E-message as the E-message received, or transmission of a CAN message based on the received E-message. hub processing executed by the hub 100 will be described below by way of FIG. 12.

The hub 100 receives an E-message from one of ports 1 through 3 (Step S11).

The hub determines whether or not the CAN flag in the received E-message is ON (step S12). If the CAN flag is ON, the received E-message will include first information (CAN message information) serving as the base for a CAN message to be transmitted to the second network, and if OFF, the E-message does not include first information.

If the CAN flag is OFF, the hub 100 uses the MAC address table to select a port corresponding to the destination E-ECU (destination MAC address) by the transfer destination selecting unit 120 (step S13). The hub 100 then sends out the same E-message as the received E-message from the port selected in step S13 (step S14), and ends processing of handling the received E-message.

In a case of having determined in step S12 that the CAN flag is ON, the hub 100 determines whether or not multiple CAN message information are included in the received E-message based on the number of message illustrated in FIG. 5 for example (step S15), and in a case where multiple CAN message information are included, splits into individual CAN message information (step S16).

The hub 100 generates a CAN message based on each CAN message information split in step S16, or, in a case of having determined in step S15 that only one CAN message information is included, based on that CAN message information (step S17). In a case where the CAN message information is configured of CAN-ID, size, and data, for example (see FIG. 5), the hub 100 generates a CAN message including the CAN-ID, size, and data (See FIG. 6). The hub 100 then sequentially sends out the generated CAN messages to the bus 30c from the port 4 (CAN port) so as to be transmitted to the CAN gateway 400 (step S18), and ends processing of handling the received E-message.

Upon a CAN message having been sent out from the hub 100 to the bus 30c, the CAN gateway 400 transfers that CAN message to both or one of the bus 30a and bus 30b, for example, based on transfer rules decided beforehand. As an example of transfer rules for the CAN gateway 400, rules stipulating the bus to be transferred to according to the CAN-ID, or the like, are used.

1.8 Transmission Sequence of Message from E-ECU to C-ECU

Figure 13:
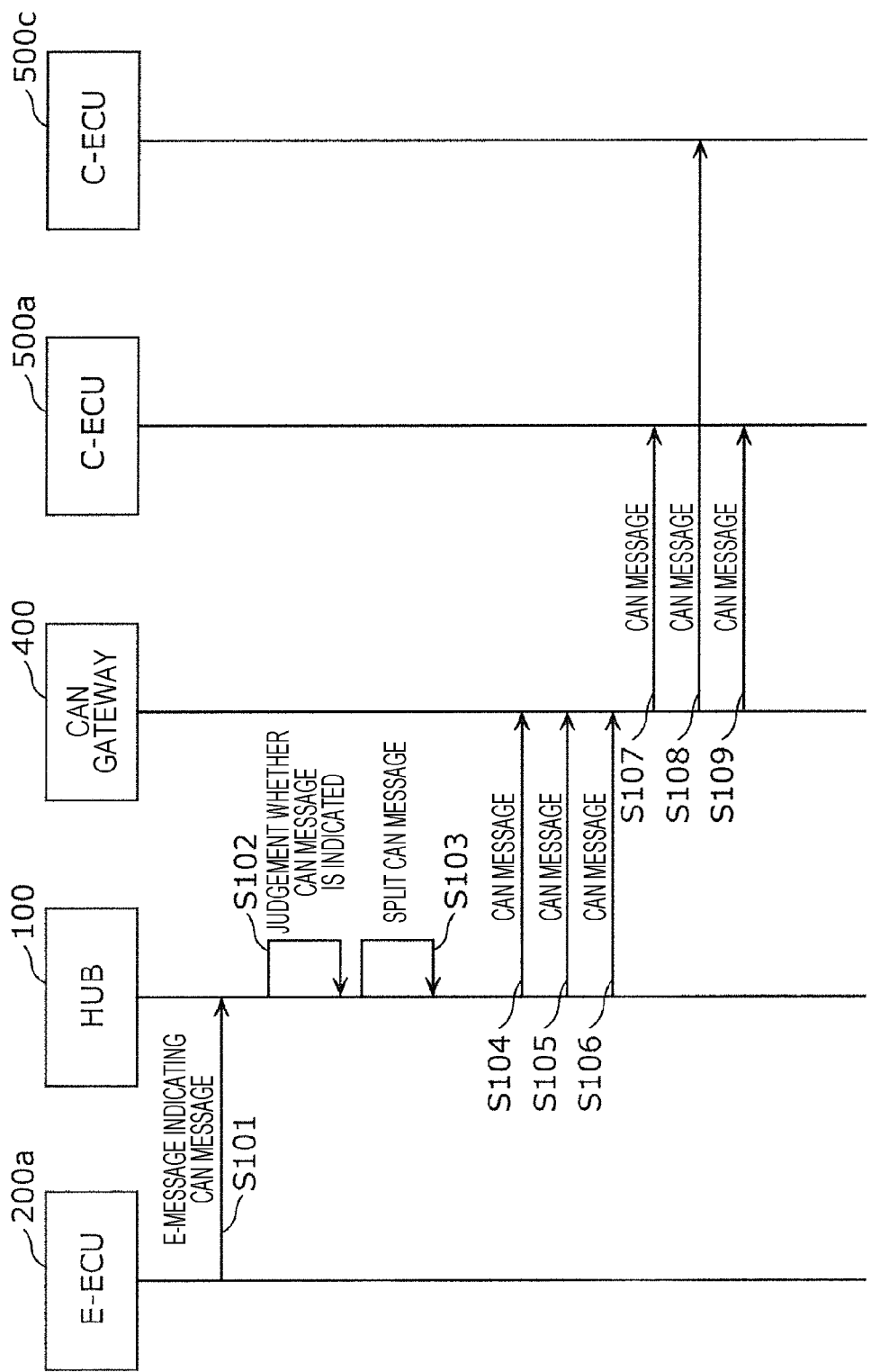
FIG. 13 is a sequence diagram illustrating an example of message transmission in the onboard network system according to the first embodiment.

FIG. 13 is a sequent diagram illustrating an example of message transmission in the onboard network system 10. Transfer of information from an ECU connected to the first network (E-ECU) to an ECU connected to the second network (C-ECU) will be described below by way of FIG. 13.

The E-ECU 200a transmits an E-message including three CAN message information including different CAN-IDs from each other, to the hub 100 via the cable 20a, as an E-message indicating a CAN message (step S101).

The hub that has received the E-message judges whether or not the E-message indicates a CAN message, from the CAN flag and so forth (step S102), and in a case of indicating a CAN message, splits the linked CAN message information included in the E-message into three individual CAN message information, as necessary (step S103).

The hub 100 then sequentially transmits the three CAN messages to the bus 30c, based on each of the CAN-ID, size, and data, of the three CAN message information (steps S104 through S106). Accordingly, the CAN gateway 400 receives the three CAN messages, and transfers the CAN messages to the busses selected based on the transfer rules, in accordance with the CAN-IDs of the received CAN messages (steps S107 through S109).

1.9 Advantages of First Embodiment

In a case where the E-ECU 200a is to transmit information to a C-ECU in the onboard network system 10 according to the first embodiment, an E-message is transmitted that includes CAN message information, a CAN flag, and so forth. Accordingly, the hub 100 will be able to appropriately select the destination of the CAN message indicated by the E-message. According to the method where a CAN flag is included in the E-message and the indicates whether or not the E-message includes CAN message information, whether or not the CAN message should be sent to the CAN bus can be identified based on the E-message, even in a case where the destination MAC address of the E-message is a broadcast address, for example. Also, the E-ECU 200a can include multiple CAN message information serving as bases for multiple CAN messages in E-messages. Accordingly, information transmission efficiency can be increased.

Second Embodiment

An example where the configuration of the in the onboard network system 10 illustrated in the first embodiment has been partially modified will be described below. The onboard network system according to a second embodiment is an arrangement where a conversion device is disposed between the hub 100 and bus 30c in the onboard network system 10 illustrated in the first embodiment (see FIG. 1), and the hub 100 is modified. Note that components in the onboard network system according to the present embodiment that are the same as those in the first embodiment are denoted by the same reference numerals as in the first embodiment, and description will be omitted. Points regarding the onboard network system according to the present embodiment that are not described in particular as the same as in the onboard network system 10 illustrated in the first embodiment.

2.1 Configuration of Onboard Network

Figure 14:
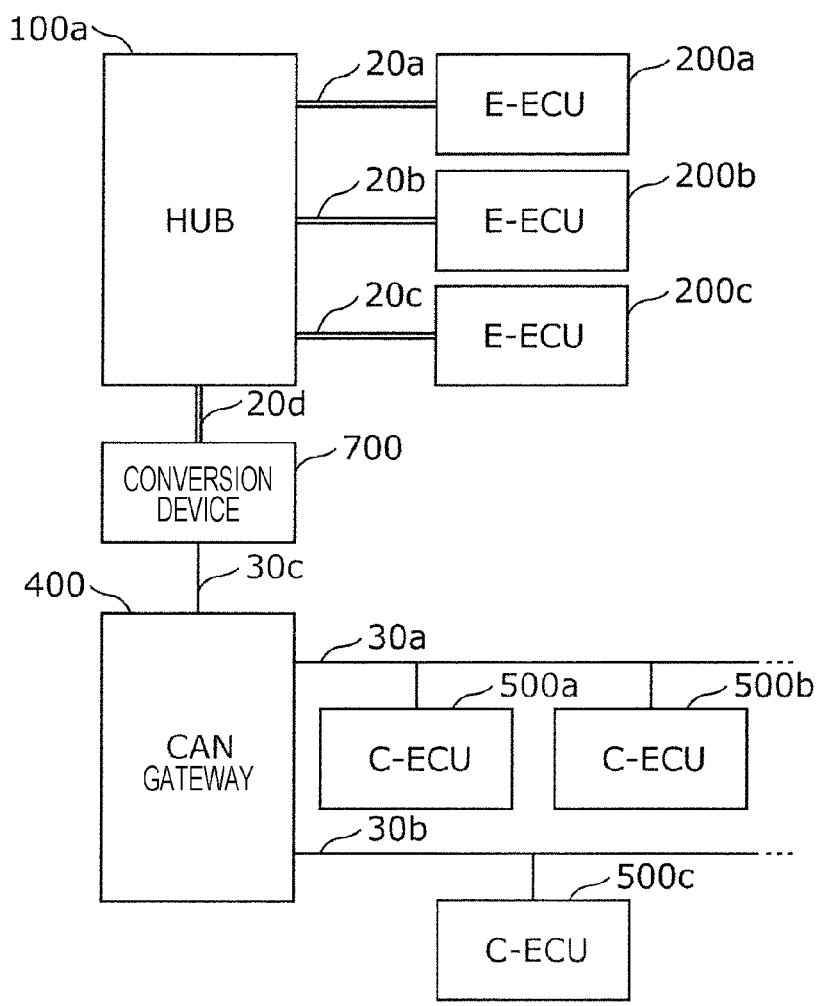
FIG. 14 is a diagram illustrating a schematic configuration of an onboard network according to a second embodiment.

FIG. 14 illustrates a schematic configuration of an onboard network according to the present embodiment. The onboard network according to the present embodiment is an arrangement where the hub 100 in the onboard network illustrated in the first embodiment (see FIG. 2) has been replaced by a hub 100a and a conversion device 700 and a cable 20d have been added.

The hub 100a does not have CAN ports but has multiple ports, to which the cables 20a through 20d that are Ethernet (registered trademark) cables are connected. The hub 100a is connected to the conversion device 700 by the cable 20d, and the conversion device 700 is connected to the CAN gateway 400 by the bus 30c.

The E-ECUs 200a through 200c in the onboard network system according to the present embodiment can communicate with each other via the first network configured by connecting the cables to the hub 100a. The C-ECUs 500a through 500d can communicate with each other via the second network configured of the busses 30a and 30b, the CAN gateway 400, and so forth. Also, for example, the E-ECU 200a can communicate with the C-ECU 500a via the cable 20a, hub 100a, cable 20d, conversion device 700, bus 30c, CAN gateway 400, and bus 30a.

2.2 Configuration of Hub 100a

Figure 15:
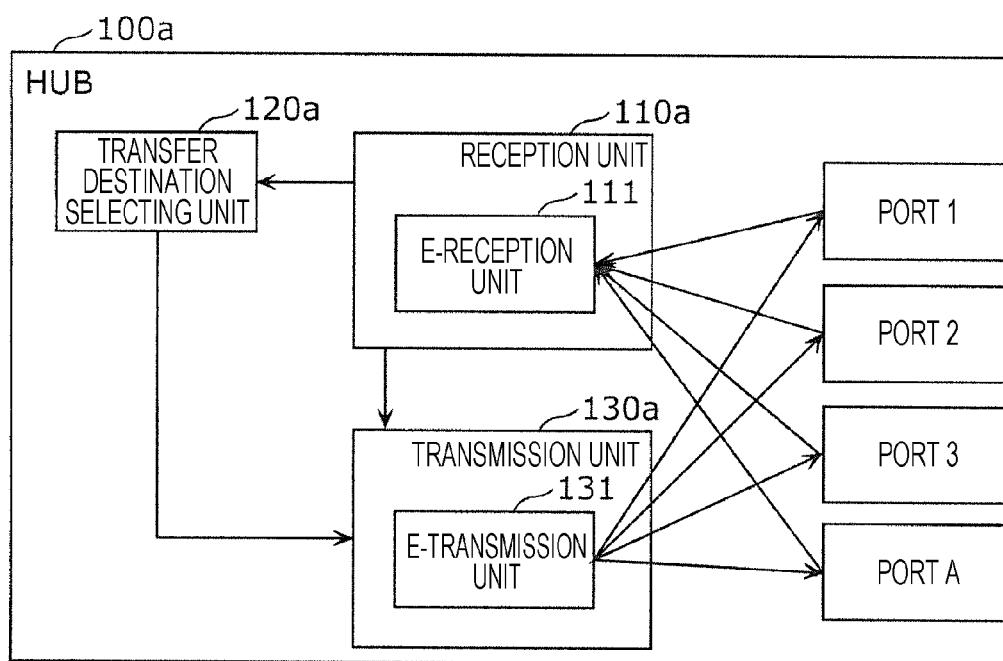
FIG. 15 is a configuration diagram of a hub according to the second embodiment.

FIG. 15 is a configuration diagram of the hub 100a. The hub 100a is a partial modification of the hub 100 illustrated in the first embodiment, and points that are not illustrated here in particular are the same as with the hub 100. The hub 100a has ports 1 through 3 and a port A. The ports 1 through 3 and port A are respectively connected to the cables 20a through 20d making up the first network. The port A is connected to the cable 20d connected to the conversion device 700. The hub 100a is configured including a reception unit 110a, a transfer destination selecting unit 120a, and a transmission unit 130a, and transfers E-messages. These components are realized by communication circuits in the hub 100a, memory, digital circuits (or a processor executing programs stored in the memory), and so forth.

The reception unit 110a includes the E-reception unit 111 that receives E-messages from the ports 1 through 3 and port A.

The transfer destination selecting unit 120a is a partial modification of the transfer destination selecting unit 120 illustrated in the first embodiment, and points that are not illustrated here in particular are the same as the transfer destination selecting unit 120. The transfer destination selecting unit 120a determines whether or not an E-message received by the reception unit 110a includes first information (CAN message information) serving as the base for a CAN message (data frame) to be transmitted to the second network, and selects the port for sending out the frame based on the E-message, based on the determination results. That is to say, in a case where the E-message received at the reception unit 110a does not include CAN message information, the transfer destination selecting unit 120a selects one of ports 1 through 3 as the destination to send E-messages of similar contents as that E-message, based on the destination MAC address in the header of that E-message.

The transfer destination selecting unit 120a selects the port by referencing a MAC address table. The destination MAC address regarding the port A in the MAC address table may be set to the particular address illustrated in the first embodiment, or the MAC address of the conversion device 700 may be set, for example. Also, the hub 100a may learn the MAC address of the conversion device 700 and update the MAC address table. In a case where the MAC address of the conversion device 700 is set as the destination MAC address regarding the port A in the MAC address table, the E-ECU 200a or the like that is the transmission source of the E-message including CAN message information may specify the MAC address of the conversion device 700 as the destination MAC address in the header of the E-message, for example. In this case, the transfer destination selecting unit 120a may select the port in accordance with the MAC address table, without confirming whether or not the E-message contains CAN message information. An arrangement may be made where, a case where whether or not the E-message contains CAN message information can be determined by the CAN flag set in the payload, information of the port A is not included in the MAC address table. In a case where the E-message received at the reception unit 110a includes CAN message information, the transfer destination selecting unit 120a selects the port A (port connected to a device connected to the bus 30c, by the cable 20d) as the sending destination of E-messages that are the same as the received E-message, regardless of whether the determination is made based on the destination MAC address of the E-message or based on the CAN flag in the E-message.

The transmission unit 130a includes the E-transmission unit 131 that transmits E-messages that are the same as the E-message received at the E-reception unit 111 (or E-messages of which at least the contents of the payload are the same) from the port (port 1 through 3 or port A) selected by the transfer destination selecting unit 120a (i.e., sends out onto the cable connected to that port).

2.3 Configuration of Conversion Device 700

Figure 16:
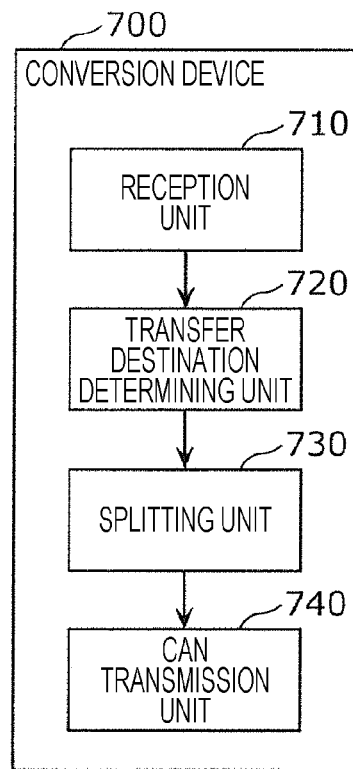
FIG. 16 is a configuration diagram of a conversion device according to the second embodiment.

FIG. 16 is a configuration diagram of the conversion device 700. The conversion device 700 is configured of, for example, a processor, digital circuits such as memory and so forth, analog circuits, communication circuits, and so forth.

The conversion device 700 has a function of converting E-messages into CAN messages, and includes a reception unit 710, a transfer destination determining unit 720, a splitting unit 730, and a CAN transmission unit 740, as functional components for realizing this function. These functional components are realized by a communication circuit in the conversion device 700, a processor executing programs stored in memory, and so forth. Note that the conversion device 700 may have a function of converting CAN messages into E-messages.

The reception unit 710 receives E-messages from the cable 20d. The transfer destination determining unit 720 determines whether or not an E-message received by the reception unit 710 includes first information (CAN message information) serving as a base for a CAN message (data frame) to be transmitted to the second network, and determines whether or not a CAN message based on the E-message should be sent out to the bus 30c, based on the results of the determination. In a case where the E-message received by the reception unit 710 does not include CAN message information, for example, the transfer destination determining unit 720 determines that a CAN message should not be sent out to the bus 30c, and discards that E-message.

In a case where the E-message received by the reception unit 710 includes CAN message information, the transfer destination determining unit 720 notifies the splitting unit 730 regarding the content of the payload of the E-message.

The splitting unit 730 has a function where, in a case where multiple linked CAN message information are included as the content of the payload of the E-message notified thereto (see FIG. 5), the splitting unit 730 splits this into individual CAN message information of the number indicated by the number of messages in FIG. 5 for example, generates the CAN messages following the CAN protocol in accordance with the CAN message information, and sequentially transmits these to the CAN transmission unit 740. The order of transmission in this case follows the order of array of the CAN message information in the payload of the E-message, for example. In a case where one CAN message information is included as the content of the payload of the E-message notified thereto, the splitting unit 730 generates a CAN message following the CAN protocol in accordance with the CAN message, and transmits this to the CAN transmission unit 740.

The CAN transmission unit 740 sequentially transmits the CAN messages to the bus 30c making up the second network, in the order of transmission from the splitting unit 730, following the CAN protocol. Accordingly, the CAN message is transferred to an appropriate bus by the CAN gateway 400 connected to the bus 30c, and received by a C-ECU.

2.4 Advantages of Second Embodiment

In the onboard network system according to the second embodiment, in a case of the E-ECU 200a transmitting information to a C-ECU, an E-message containing CAN message information, a CAN flag, and so forth, is transmitted. This enables the hub 100a to appropriately select the transmission destination of the E-message containing the CAN message information. According to the method where a CAN flag is included in the E-message and the E-message includes CAN message information, the hub 100a can transmit just E-messages containing CAN message information to the conversion device 700 having a function to convert to CAN messages, even in a case where the destination MAC address of the E-message is a broadcast address, for example. Note that an arrangement may be made where the conversion device 700 is connected to both a first network where transmission of first-type frames (e.g., Ethernet (registered trademark) frames) is performed following a first communication protocol (e.g., Ethernet (registered trademark) protocol), and a second network where transmission of second-type frames (e.g., CAN messages that are data frames) is performed following a second communication protocol (e.g., CAN protocol) that is different form the first communication protocol, and includes a reception unit that receives first-type frames from the first network, and a transmission unit that, in a case where a first-type frame received by the reception unit includes first information serving as a base for a second-type frame to be transmitted to the second network, a frame (e.g., CAN message) based on the first-type frame is sent out to the second network.

Third Embodiment

Another example where the configuration of the onboard network in the onboard network system 10 illustrated in the first embodiment has been partially modified, will be described below. The onboard network system according to a third embodiment is an arrangement where the hub 100 in the onboard network system 10 illustrated in the first embodiment (see FIG. 1) also includes the functions of the CAN gateway 400. Note that components in the onboard network system according to the present embodiment that are the same as those in the first embodiment are denoted by the same reference numerals as in the first embodiment, and description will be omitted. Points regarding the onboard network system according to the present embodiment that are not described in particular as the same as in the onboard network system 10 illustrated in the first embodiment.

3.1 Configuration of Onboard Network

Figure 17:
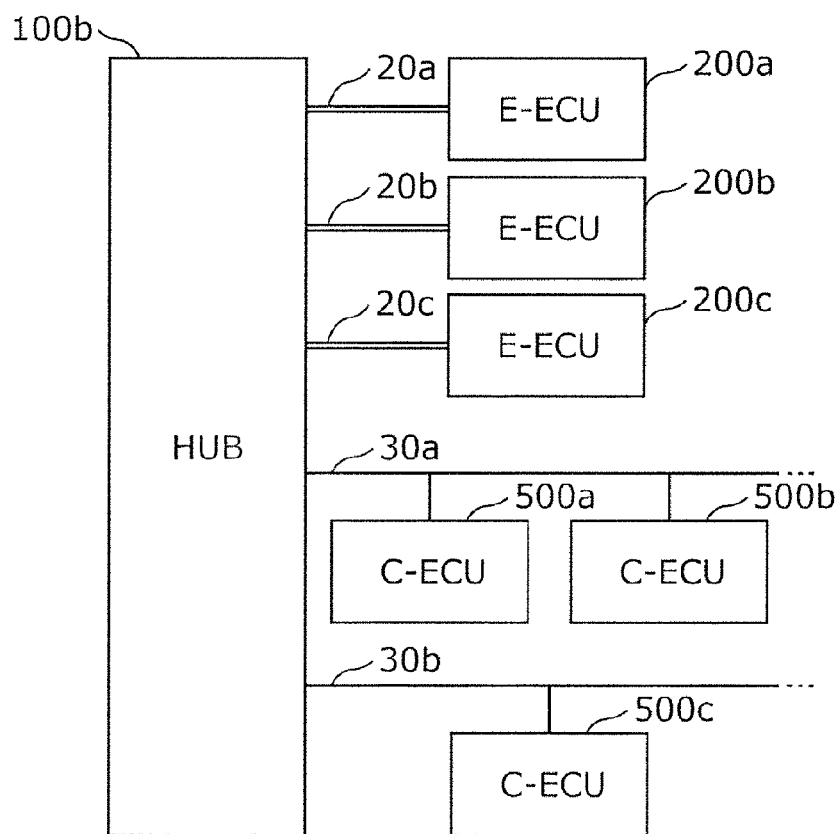
FIG. 17 is a diagram illustrating a schematic configuration of an onboard network according to a third embodiment.

FIG. 17 illustrates a schematic configuration of an onboard network according to the present embodiment. The onboard network according to the present embodiment is an arrangement where the CAN gateway 400 and bus 30c in the onboard network illustrated in the first embodiment (see FIG. 2) have been omitted, and the hub 100 has been replaced by a hub 100b including the same function as the CAN gateway 400.

The hub 100b has multiple ports for connecting to E-ECUs (i.e., terminals for connecting Ethernet (registered trademark) cables). The hub 100b also has multiple ports for connecting to busses to which one or multiple C-ECUs are connected (i.e., terminals for connecting to busses). That is to say, the hub 100b has ports to connect to the cables 20a through 20c, and to the busses 30a and 30b.

The E-ECUs 200a through 200c in the onboard network system according to the present embodiment can communicate with each other via the first network configured by connecting the cables to the hub 100b. The C-ECUs 500a through 500d can communicate with each other via the second network configured of the busses 30a and 30b. Also, for example, the E-ECU 200a can communicate with the C-ECU 500a via the cable 20a, hub 100b, and bus 30a.

3.2 Configuration of Hub 100b

Figures 18, 19:
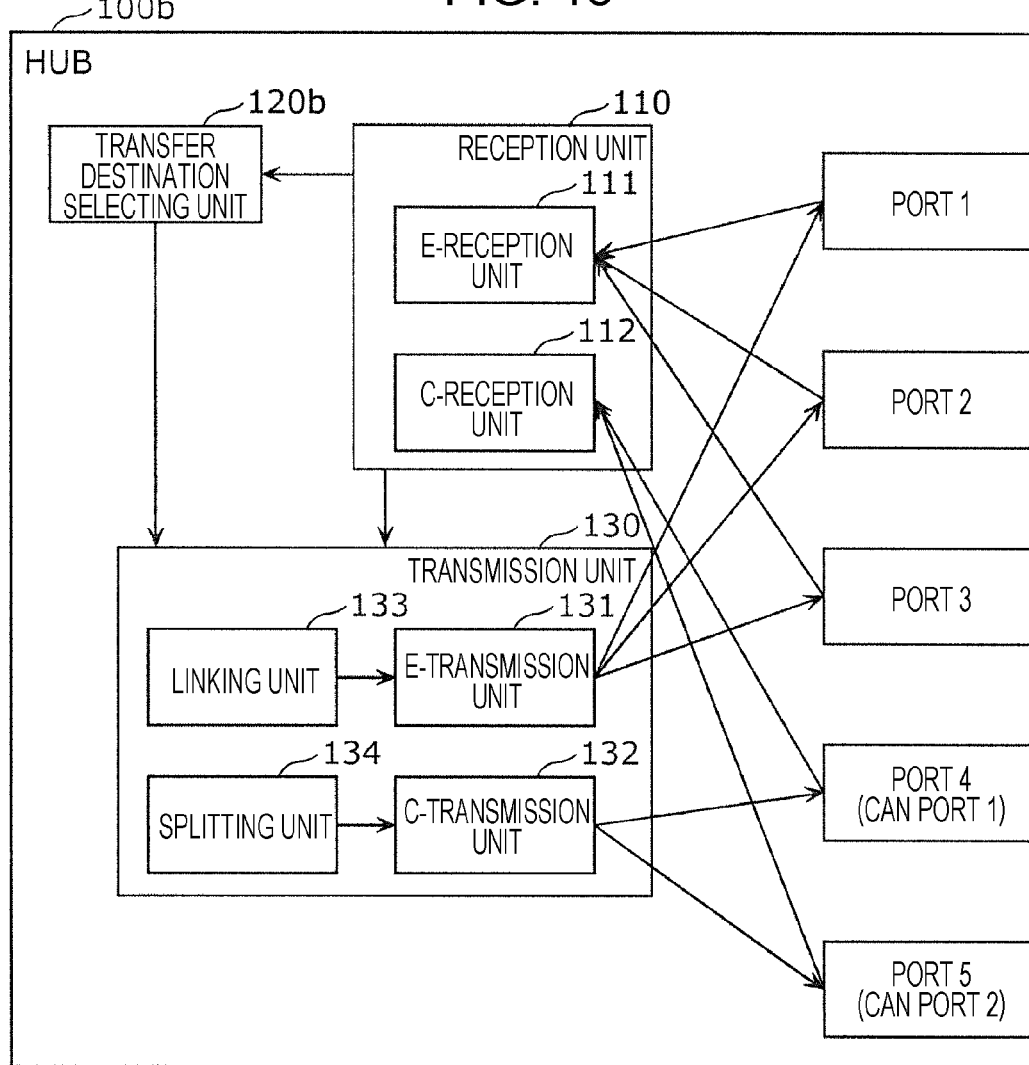
FIG. 18 is a configuration diagram of a hub according to the third embodiment.
FIG. 19 is a diagram illustrating an example of an addressee table used at the hub according to the third embodiment.

FIG. 18 is a configuration diagram of the hub 100b. The hub 100b has ports 1 through 5. The ports 1 through 3 are respectively connected to the cables 20a through 20c making up the first network. The port 4 (CAN port 1) and port 5 (CAN port 2) are respectively connected to the busses 30a and 30b making up the second network. Although the hub 100b may have three or more CAN ports, an example of having two is illustrated here, for the sake of convenience of description. The hub 100b includes the reception unit 110, a transfer destination selecting unit 120b, and the transmission unit 130, as illustrated in FIG. 18. These components are realized by communication circuits in the hub 100b, memory, digital circuits (or a processor executing programs stored in the memory), and so forth.

The reception unit 110 includes the E-reception unit 111 that receives E-messages from the ports 1 through 3, and the C-reception unit 112 that receives CAN messages from the ports 4 and 5.

The transfer destination selecting unit 120b determines whether or not an E-message received by the reception unit 110 includes first information (CAN message information) serving as the base of a CAN message (data frame) to be transmitted to the second network, and selects a port to send out the frame based on the E-message, based on the results of the determination. That is to say, in a case where an E-message received by the reception unit 110 does not include CAN message information, the transfer destination selecting unit 120b selects one of the ports 1 through 3 as the sending destination of E-messages having the same content as that E-message, based on the destination MAC address in the header of the E-message. The transfer destination selecting unit 120b performs selection of the ports 1 through 3 by referencing a MAC address table.

In a case where an E-message received by the reception unit 110 includes CAN message information, the transfer destination selecting unit 120b selects one of ports 4 and 5 as the destination to send the CAN message based on that CAN message information, in accordance with an addressee table. In a case where a CAN message has been received by the reception unit 110, the transfer destination selecting unit 120b selects one of ports 4 and 5 as the transfer destination of that CAN message, in accordance with the addressee table. FIG. 19 illustrates an example of an addressee table that the hub 100b uses. In the example in FIG. 18, the addressee table is a table where transmission sources of received frames, CAN-IDs in a case where the frame is a CAN message, and the addressee of the frame are correlated. In a case where a received frame is an E-message, the transmission source of the received frame indicates the transmission source MAC address, and in a case where the frame is a CAN message, indicates the CAN port where that frame was received (CAN port 1 or CAN port 2). In the example in FIG. 19, the transfer destination selecting unit 120b selects the CAN port 2 in a case of having received an E-message containing CAN message information with CAN-ID "0x123" from an E-ECU having MAC address 1, as the sending destination of the CAN message based on that CAN message information. In a case of having received an E-message containing CAN message information from an E-ECU having MAC address 2, the transfer destination selecting unit 120b selects both CAN port 1 and CAN port 2 as the sending destination of the CAN message based on that CAN message information. In a case of having received a CAN message with CAN-ID "0X345" or CAN-ID "0x456" from the CAN port 1, the transfer destination selecting unit 120b selects the CAN port 2 as the transfer destination of that CAN message.

The transmission unit 130 includes the E-transmission unit 131, C-transmission unit 132, linking unit 133, and splitting unit 134. In a case where one or both of the port 4 (CAN port 1) and port 5 (CAN port 2) has been selected by the transfer destination selecting unit 120b, the C-transmission unit 132 transmits a CAN message based on CAN message information in a received E-message, or a received CAN message, to the selected port.

Note that the hub 100b may have a function of generating E-messages based on CAN messages received by the C-reception unit 112, and transmitting from one of the ports 1 through 3.

3.3 Advantages of Third Embodiment

In the onboard network system 10 according to the third embodiment, the E-ECU 200a transmits an E-message including CAN message information, a CAN flag, and so forth, when transmitting information to a C-ECU. This enables the hub 100b to appropriately select the transmission destination of the CAN message indicated in the E-message.

The hub 100b according to the third embodiment also has a function of transferring CAN messages among CAN busses, so the number of devices configuring the onboard network can be reduced. Reduction of the number of devices installed in the vehicle yields advances such as reduction in costs, suppressed malfunction rates, and so forth. The hub 100b also selects a CAN bus from which a CAN message should be sent, from a CAN-ID included in the CAN message information or the like. Accordingly, transmission of information is realized by the E-ECU 200a including a CAN-ID corresponding to the C-ECU to which the information is to be transmitted, in an E-message.

Fourth Embodiment

An example where the ECUs (E-ECU 200a, etc.) and hub 100 in the onboard network system 10 illustrated in the first embodiment have been partially modified will be described below. An example has been illustrated in the first embodiment where, in a case of the E-ECU 200a transmitting an E-message containing CAN message information, multiple CAN message information can be included in the E-message, as in FIG. 5 for example. Conversely, in the present embodiment, in a case of the E-ECU 200a including CAN message information in an E-message, only one CAN message information can be included in the E-message, as in FIG. 4. Note that the E-ECU 200b and E-ECU 200c are the same as the E-ECU 200a.

The onboard network system according to a third embodiment is an arrangement where the hub 100 in the onboard network system 10 illustrated in the first embodiment (see FIG. 1) has been replaced by a hub 100c (described later) where the hub 100 has been partially modified. Note that components in the onboard network system according to the present embodiment that are the same as those in the first embodiment are denoted by the same reference numerals as in the first embodiment, and description will be omitted. Points regarding the onboard network system according to the present embodiment that are not described in particular as the same as in the onboard network system 10 illustrated in the first embodiment.

4.1 Configuration of Hub 100c

Figure 20:
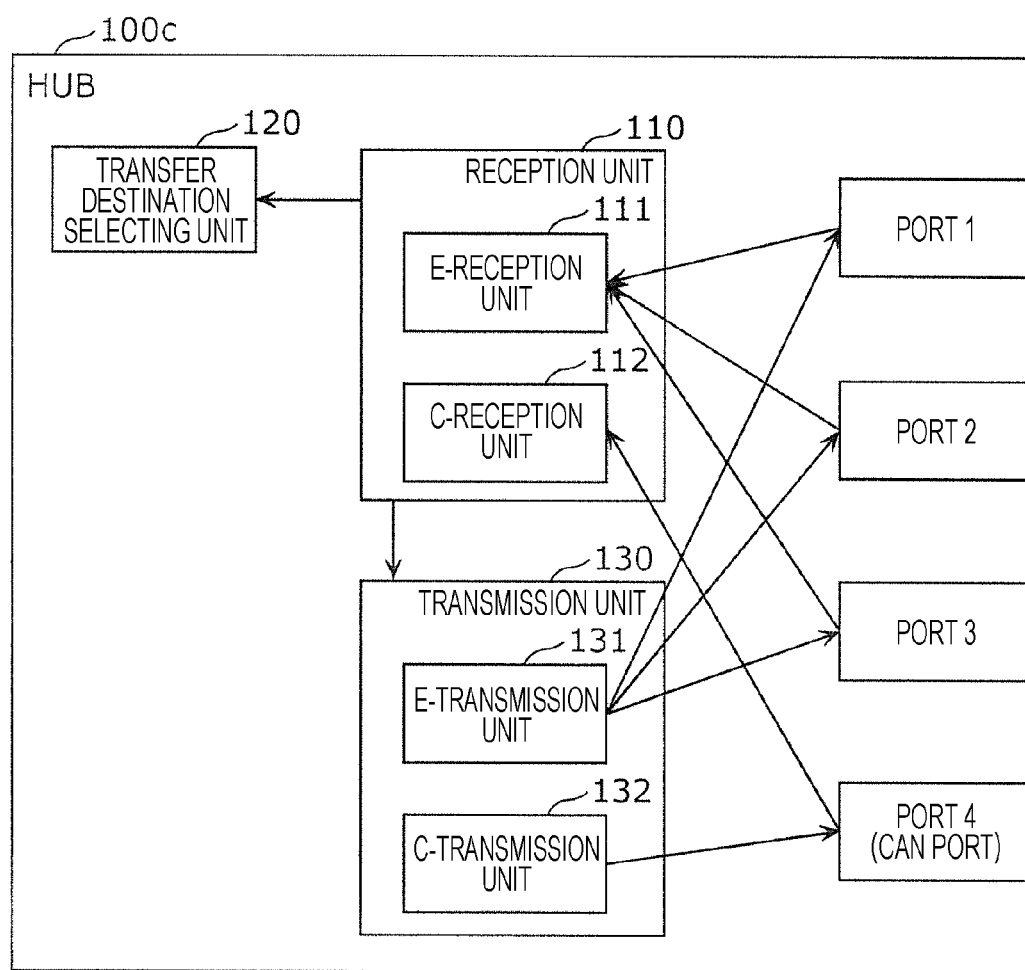
FIG. 20 is a configuration diagram of a hub according to a fourth embodiment.

FIG. 20 is a configuration diagram of the hub 100c. The hub 100c has a configuration where the transmission unit 130 of the hub 100 illustrated in the first embodiment has been replaced by a transmission unit 130b. The hub 100c is configured including the reception unit 110, transfer destination selecting unit 120, and transmission unit 130b, as illustrated in FIG. 20. These components are realized by communication circuits in the hub 100c, memory, digital circuits (or a processor executing programs stored in the memory), and so forth.

The transmission unit 130b includes the E-transmission unit 131 and C-transmission unit 132. The E-transmission unit 131 has a function of transmitting E-messages from ports 1 through 3, and the C-transmission unit 132 has a function of transmitting CAN messages from the port 4 in accordance with the CAN protocol. Specifically, in a case where the port selected by the transfer destination selecting unit 120 regarding an E-message received by the reception unit 110 is port 4 (CAN port) for example, the C-transmission unit 132 generates a CAN message based on the CAN message information included in the received E-message, and sends this CAN message out from the port 4 to the bus 30c. Note that the hub 100c may also have a function of generating an E-message based on a CAN message received at the C-reception unit 112 and transmitting from one of the ports 1 through 3.

4.2 Operations of E-ECU

Figure 21:
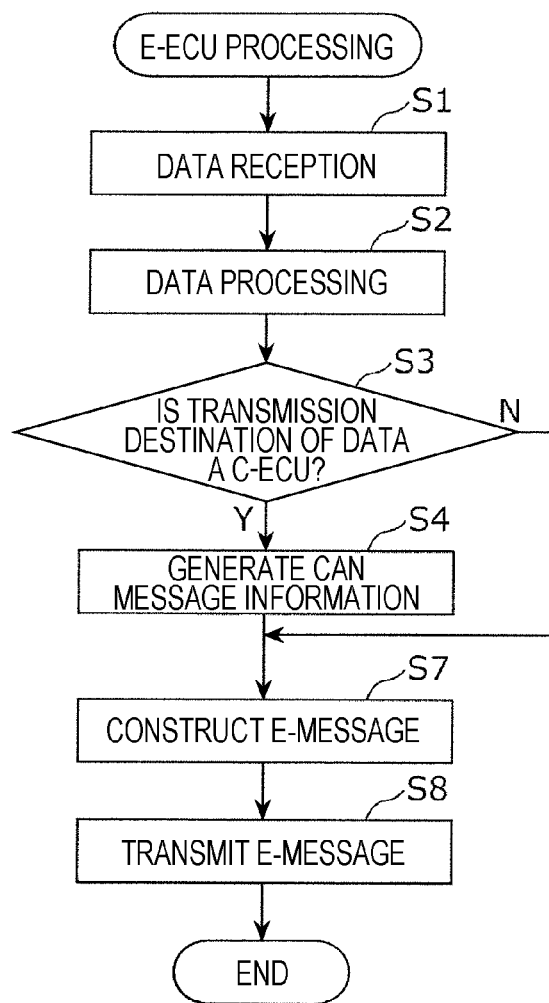
FIG. 21 is a flowchart illustrating an example of operations of the E-ECU according to the fourth embodiment.

FIG. 21 is a flowchart illustrating E-ECU processing, as an example of operations of an E-ECU according to the present embodiment. E-ECU processing executed by the E-ECU 200a will be described below by way of FIG. 21. Note that processing steps in the E-ECU processing according to the present embodiment that are the same as those illustrated in the first embodiment (see FIG. 11) are denoted in FIG. 21 with the same symbols as in FIG. 11, and description will be omitted here as appropriate.

The E-ECU 200a receives external information from the reception unit 210 (step S1), and performs generating of various types of information to be transmitted to another ECU at the data processing unit 221 (step S2). The E-ECU 200a determines, regarding each information generated by the data processing unit 221, whether the transmission destination of the information is a C-ECU or not in accordance with the data type of the information, using an addressee table (step S3). In a case where the transmission destination of the information is a C-ECU, the E-ECU 200a sets a CAN-ID in accordance with the data type of the information, and generates CAN message information indicating the CAN-ID, the data indicating the information generated by the data processing unit 221, and the size of the data, using the CAN message constructing 224 (step S4).

In a case of having determined in step S3 that the transmission destination is a C-ECU, the E-ECU 200a constructs an E-message including one CAN message information generated in step S4 in the payload, using the message constructing unit 223 (step S7). In a case where the E-ECU 200a has determined in step S3 that the transmission destination is not a C-ECU, in step S7 an E-message including the data indicating the information generated by the data processing unit 221 in the payload is constructed by the message constructing unit 223.

The E-ECU 200a transmits the E-message generated in step S7 to the cable 20a by the transmitting unit 230 (step S8). The E-message transmitted by the E-ECU 200a will be received by the hub 100c. Note that the E-ECU 200b and E-ECU 200c can also operate in the same way as the E-ECU 200a.

4.3 Operations of Hub 100c

FIG. 22 is a flowchart illustrating hub processing, as an example of operations of the hub 100c. hub processing executed by the hub 100c will be described below by way of FIG. 22. Note that processing steps in the hub processing according to the present embodiment that are the same as those illustrated in the first embodiment (see FIG. 12) are denoted in FIG. 22 with the same symbols as in FIG. 12, and description will be omitted here as appropriate.

The hub 100c receives an E-message from one of ports 1 through 3 (step S11), and determines whether or not CAN message information is included in this E-message (step S12a). This determination may be performed based on whether or not the CAN flag is ON, for example, or whether or not the destination MAC address of the header of the E-message is the particular address illustrated in the first embodiment or the like, for example.

In a case where determination is made in step S12a that CAN message information is not included in the received E-message, the hub 100c uses the MAC address table to select a port corresponding to the destination E-ECU, using the transfer destination selecting unit 120 (step S13), sends out the same E-message as the received E-message from the selected port (step S14), and ends processing of handling the received E-message.

In a case of having determined in step S12a that CAN message information is included in the received E-message, the hub 100c generates a CAN message based on the CAN message information included in the received E-message (step S17). In a case where the CAN message information is configured of CAN-ID, size, and data (see FIG. 4), for example, the hub 100c generates a CAN message including the CAN-ID, size, and data (See FIG. 6). The hub 100c then sends out the generated CAN message to the bus 30c from the port 4 (CAN port) so as to be transmitted to the CAN gateway 400 (step S18), and ends processing of handling the received E-message. Upon a CAN message having been sent from the hub 100c to the bus 30c, the CAN gateway 400 transfers that CAN message to both or one of the bus 30a and bus 30b, for example, based on transfer rules decided beforehand.

4.4 Advantages of Fourth Embodiment

In a case where the E-ECU 200a is to transmit information to a C-ECU in the onboard network system 10 according to the fourth embodiment, an E-message is transmitted that includes CAN message information, a CAN flag, and so forth. Accordingly, the hub 100c will be able to appropriately select the destination of the CAN message indicated by the E-message. By the E-ECU 200a including CAN message information for one CAN message in the E-message, the hub 100c does not have to bear the load of processing such as splitting the contents of the payload of the E-message that has been received.

Fifth Embodiment

A modification of the E-ECU 200a and hub 100 illustrated in the first embodiment will be described. An arrangement has been made in the first embodiment where, in a case of the transmission destination determining unit 222 in the generating unit 220 of the E-ECU 200a having determined that the ECU to be the destination of information in the addressee table in FIG. 8 is a C-ECU, a particular address that has been decided beforehand is notified to the message constructing unit 223 as the destination MAC address. Although a broadcast address, multicast address, and so forth, have been exemplified as the particular address in the first embodiment, an example of using a local MAC address as the particular address will be described in a fifth embodiment. A local MAC address is where the value of a bit in a MAC address for identifying whether or not a global MAC address has been set to a value that is not a global MAC address.

For example, the E-ECU 200a may use an addressee table such as illustrated in FIG. 23. The addressee table in FIG. 23 has a destination MAC address correlated with each data type, and a local MAC address such as "02:aa:bb:cc:01:23", "02:aa:bb:cc:02:34", or the like is included as the destination MAC address. In this example, the data type to which the local MAC address has been correlated is information to be transmitted to the C-ECU.

In a case of generating an E-message with the first information (CAN message information) included, the generating unit 220 of the E-ECU 200a includes, as the destination MAC address in the header of the E-message, a particular value (particular address or the like) set to indicate second information that represents that the E-message includes first information to be transmitted to the second network. This particular value may be the particular address illustrated in the first embodiment, or may be a data value where the value of a bit in a MAC address for identifying whether or not a global MAC address has been set to a value that is not a global MAC address (local MAC address). Third information representing part of a CAN message, such as CAN-ID or the like, may be included using this data value (local MAC address) for example, thereby reducing the content of the CAN message information included in the payload of the E-message. For example, the generating unit 220 may set a data value representing a CAN-ID as the destination MAC address of the E-message, and set CAN message information that includes size and data but does not include the CAN-ID in the payload.

Figures 24, 25:
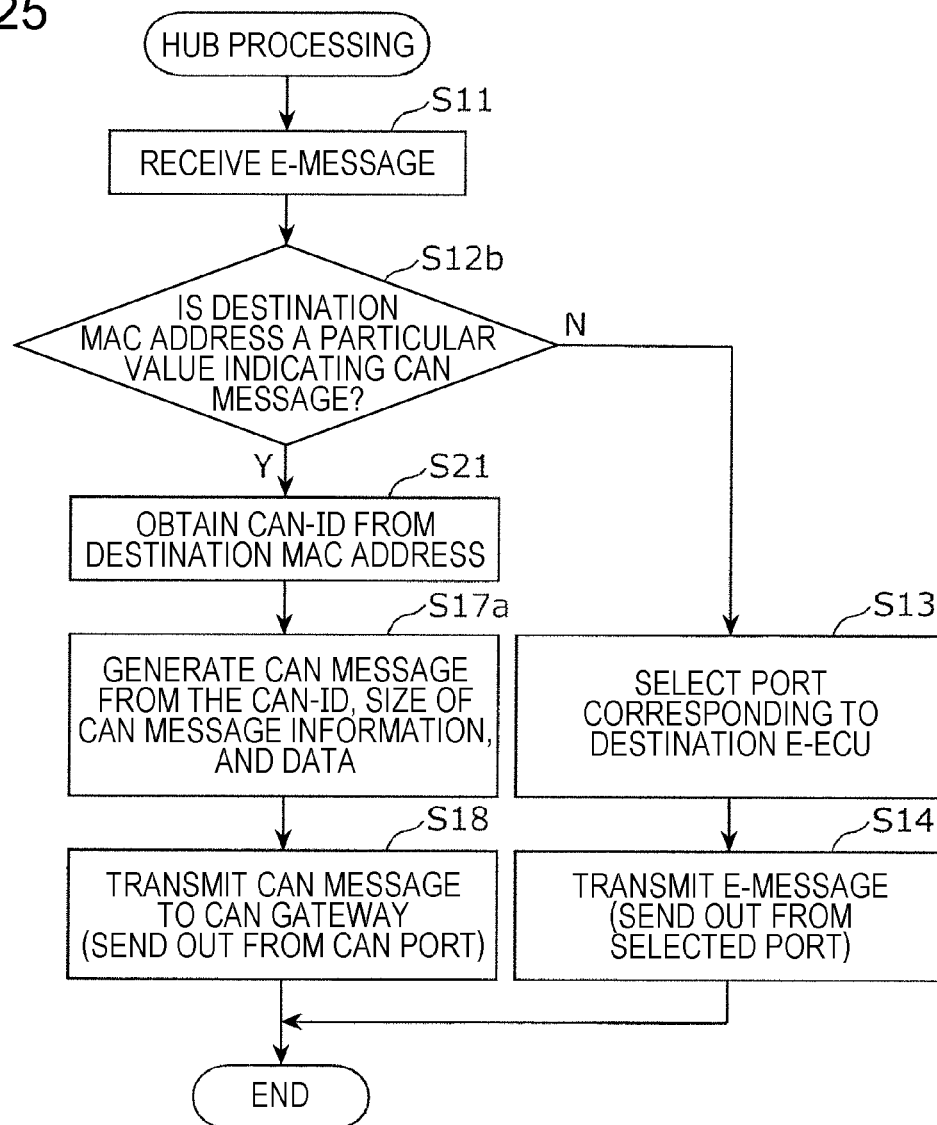
FIG. 24 is a diagram illustrating an example of a correlation table where MAC addresses and CAN-IDs are correlated, used at a hub according to the fifth embodiment.
FIG. 25 is a flowchart illustrating an example of operations of the hub according to the fifth embodiment.

An arrangement may also be made where the hub 100 judges whether or not CAN message information is included in a received E-message not by whether or not the CAN flag is set to ON, but by whether or not a particular value such as described above (e.g., a local MAC address or the like) is set in the destination MAC address in the header of the E-message. Accordingly, whether or not information to be transmitted to the second network is included in the payload can be determined simply by referencing the header of the E-message, and in a case where the payload of the E-message is encrypted for example, processing can be simplified (decryption can be omitted, etc.). The hub 100 may also identify the CAN-ID using the correlation table illustrated in FIG. 24, based on the particular value set in the destination MAC address in the header of the E-message (e.g., a local MAC address or the like). FIG. 24 illustrates a correlation table where MAC addresses and CAN-IDs have been correlated.

FIG. 25 is a flowchart illustrating hub processing, as an example of operations of a modified hub 100 according to the present embodiment. hub processing by a modified hub 100 will be described below with reference to FIG. 15. Note that in the hub processing according to the present embodiment, processing steps the same as those illustrated in the first embodiment (see FIG. 12) are denoted in FIG. 25 with the same symbols as in FIG. 12, and description will be omitted here as appropriate. Also, description will be made under the assumption that the generating unit 220 of the E-ECU 200*a* sets a data value corresponding to the CAN-ID as the destination MAC address in the E-message (local MAC address), and one CAN message information is set in the payload including size and data but not including the CAN-ID.

The modified hub 100 receives an E-message from one of the ports 1 through 3 (Step S11), and determines whether or not CAN message information is included in that E-message by whether the destination MAC address of the header is the particular value (step S12*b*). This determination may be made by determination based on whether or not the destination MAC address is the above-described particular address, for example, or may be determined based on just the value of a bit for identifying whether or not the destination MAC address is a global MAC address or not.

In a case where the modified hub 100 has determined in step S12*b* that CAN message information is not included in the received E-message (in a case of having determined that the destination MAC address of the header is not the particular value), the transfer destination selecting unit 120 uses the MAC address table to select a port corresponding to the destination E-ECU (step S13), sends out the same E-message as the received E-message from the selected port (step S14), and ends processing regarding the received E-message.

In a case where the modified hub 100 has determined in step S12*b* that CAN message information is included in the received E-message (in a case of having determined that the destination MAC address of the header is the particular value), a CAN-ID is obtained from that destination MAC address based on the correlation table (see FIG. 24) (step S21). Note that any method may be used as a method to obtain a CAN-ID from the destination MAC address that is the particular value. Besides the method of using the correlation table, the method for obtaining this CAN-ID may be a method where the E-ECU 200*a* that is the transmission source of the E-message sets the particular value such that the CAN-ID is included in part of the destination MAC address, and the modified hub 100 extracts the CAN-ID from this destination MAC address, for example. Alternatively, a method may be used where the E-ECU 200*a* transmits an E-message where a particular value that is the result of a predetermined computation with regard to the CAN-ID is set as the destination MAC address, and the modified hub 100 calculates the CAN-ID from the destination MAC address by computation corresponding to the predetermined computation.

Next, the modified hub 100 generates a CAN message based on the CAN-ID obtained in step S21, and the size and data that is the CAN message information in the payload of the E-message that has been received (step S17*a*). The modified hub 100 then sends the generated CAN message to the bus 30*c* from the port 4 (CAN port), thereby transmitting the CAN message to the CAN gateway 400 (step S18), and the processing of handling the received E-message ends.

Thus, the transmission unit 130 of the modified hub 100 performs sending of a CAN message, which includes first information (CAN message information) in an E-message received at the reception unit 110 to the bus 30*c*, by placing a CAN-ID identified based on the value of the destination MAC address in the header of the E-message in the ID filed of the CAN message, placing data (data field value) that the CAN message information indicates in the data field of the CAN message, and sending the generated CAN message out to the bus 30*c*.

OTHER EMBODIMENTS

The first through fifth embodiments have been described above as examples of technology relating to the present disclosure. However, the technology relating to the present disclosure is not restricted to these, and embodiments where modification, substitution, addition, omission, and so forth have been made as appropriate are also applicable. For example, the following modifications are also included in an embodiment of the present disclosure.

Figures 26, 27:
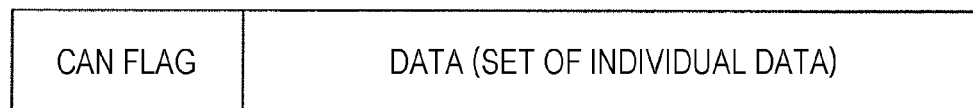
FIG. 26 is a diagram illustrating a modification of the configuration of an E-message payload.
FIG. 27 is a diagram illustrating an example of a correlation table where positions of each individual data within an E-message payload, and CAN-IDs have been correlated, in the modification.

(1) Although description has been made in the above embodiments where the E-ECU 200*a* places first information (CAN message information) made up of a CAN flag, CAN-ID, size, and data, in the payload of an E-message (see FIGS. 4 and 5), an arrangement may be made where a CAN flag, and first information (CAN message information) serving as a set of data that is the content of the data field in a CAN message (also referred to as individual data here) are placed in the payload, as illustrated in FIG. 26. In a case where first information is included in the payload, the CAN flag is set to ON for example, and used as second information indicating that first information is included. In this case, the hub 100 can identify the contents of individual CAN messages out of the set of the individual data in the payload of the received E-message, using the correlation table exemplarily illustrated in FIG. 27, and transmit CAN messages. The example in FIG. 27 indicates that individual data, which is data (contents of the data field) of a CAN message of which the CAN-ID is "0x123", is disposed from the second byte of the payload of the E-message, and has a size of two bytes. This also indicates that individual data, which is data (contents of the data field) of a CAN message of which the CAN-ID is "0x234", is disposed from the first byte of the payload of the E-message, and has a size of one byte. Specifically, in this case, the transmission unit 130 of the hub 100 sends out the CAN message to the bus 30c by placing, with regard to each set of individual data included in an E-message that the hub 100 has received, a CAN-ID identified based on placement of the individual data in the payload, in the ID field of the CAN message, placing the value of the individual data in the data field of the CAN message, and sending out the CAN message thus generated to the bus 30c. Accordingly, the E-ECU 200a can transmit individual data to C-ECUs by placing individual data in the payload of E-messages and transmitting, in accordance with a correlation table the same as with the hub 100. Note that an arrangement may be made regarding the correlation table exemplarily illustrated in FIG. 27 where a flag is provided indicating whether or not each individual data is valid, and the hub 100 only extracts valid individual data and transmits. Alternatively, an arrangement may be made where the E-ECU 200a does not have a correlation table the same as with the hub 100, and transmits E-messages having a payload configured using the same format for cases of transmitting information to E-ECUs. and transmitting to C-ECUs. In this case, an arrangement may be made where the correlation table that the hub 100 uses (see FIG. 27) may be appropriately set beforehand in accordance with the data configuration of E-messages that the E-ECU 200a transmits to C-ECUs.

Figure 28:
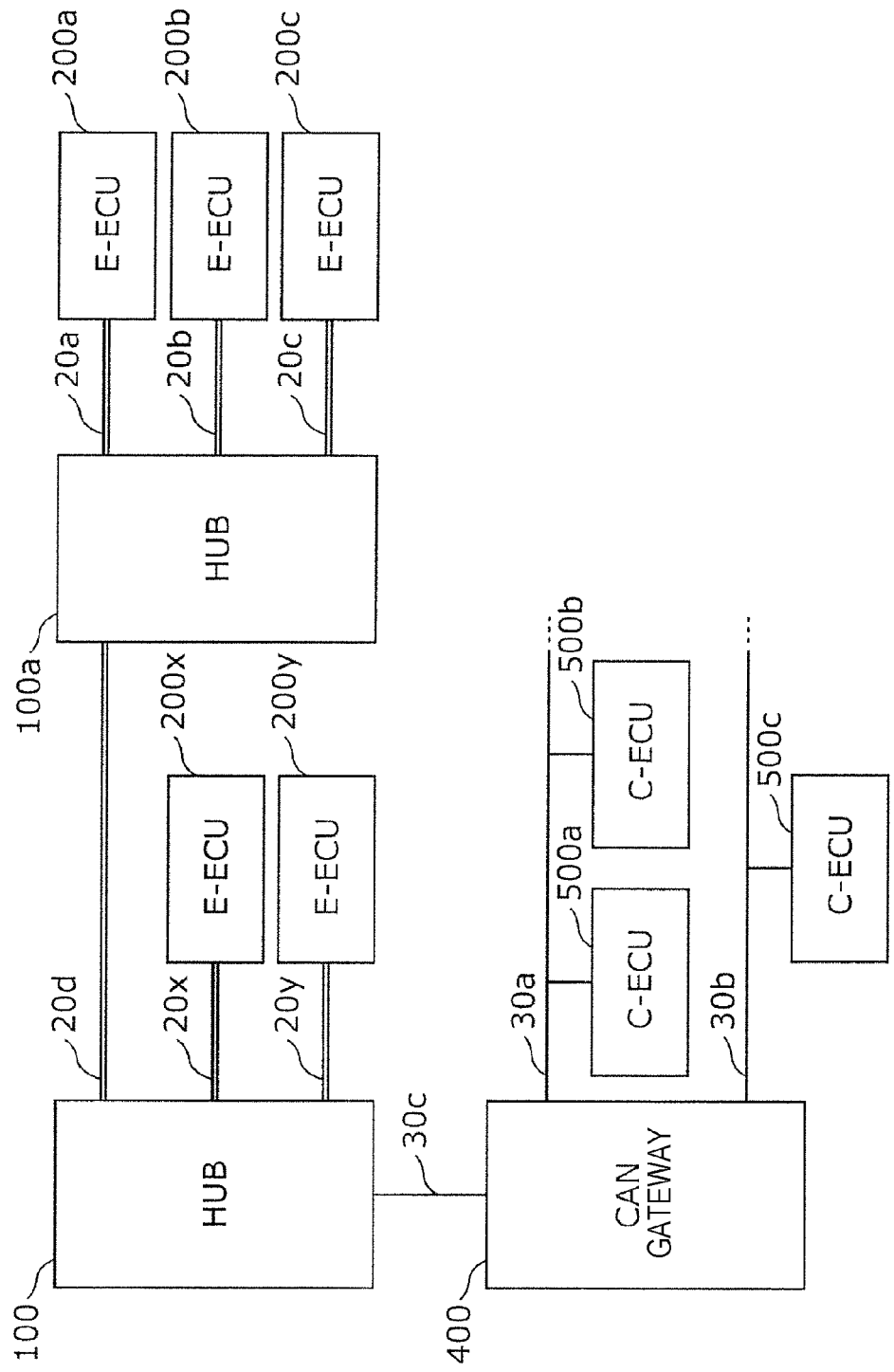
FIG. 28 is a diagram illustrating a schematic configuration of an onboard network according to the modification.

(2) The onboard network system 10 illustrated in the above-described first embodiment may include one or multiple of the hub 100a illustrated in the above-described second embodiment, besides the hub 100. FIG. 28 illustrates an example where a hub 100a is disposed between the E-ECU 200a and hub 100. In this onboard network, E-messages including CAN message information transmitted by the E-ECU 200a pass through the hub 100a in the first network and reach the hub 100. In this case, the hub 100a handles the hub 100 in the same way as the conversion device 700 in the second embodiment. The hub 100 generates CAN messages based on CAN message information in received E-messages, and transmits to the CAN bus 30c making up the second network. Thus, CAN messages reach C-ECUs via the CAN gateway 400, for example.

(3) Although an onboard network system has been illustrated in the above-described embodiments, the above-described devices such as the ECUs (E-ECUs and C-ECUs), hub, conversion device, and so forth, may be used in various types of network communication systems such as in robots, industrial devices, and so forth.

(4) Description has been made in the above embodiments regarding an arrangement where an onboard network includes a first network and a second network, the first network transmitting E-messages (Ethernet (registered trademark) frames) following the Ethernet (registered trademark) protocol and the second network transmitting CAN messages (data frames) over a CAN bus following the CAN protocol. This CAN protocol is to be understood to have a broad meaning, encompassing derivative protocols such as CANOpen used in embedded systems within automation systems and so forth, TTCAN (Time-Triggered CAN), CANFD (CAN with Flexible Data Rate) and so forth. Data frames in the CAN protocol may be in an extended ID format, besides in the standard ID format. In the case of an extended ID format, the 29 bits of the base ID in the ID field in the standard ID format, and the extended ID, having been combined, can be used as the CAN-ID in the above-described embodiments. Ethernet (registered trademark) frames may be Ethernet (registered trademark) Version 2 frames, or may be frames stipulated by IEEE 802.3, for example. The Ethernet (registered trademark) protocol may be understood to have a broad meaning, encompassing derivative protocols such as Ethernet (registered trademark) Audio Video Bridging (AVB) relating to IEEE 802.1, Ethernet (registered trademark) Time Sensitive Networking (TSN) relating to IEEE 802.1, Ethernet (registered trademark)/Industrial Protocol (IP), Ethernet (registered trademark) for Control Automation Technology (EtherCAT (registered trademark)), and so forth. An arrangement may be made where the first network transmits first-type frames (e.g., E-messages or the like) following a first communication protocol, and the second network transmits second-type frames (e.g., CAN messages or the like) over a bus following a second communication protocol that differs from the first communication protocol. In this case, the first communication protocol is the Ethernet (registered trademark) protocol for example, but is not restricted to the Ethernet (registered trademark) protocol, and may be a BroadR-Reach protocol, for example. Also, the second communication protocol is the CAN protocol for example, but is not restricted to the CAN protocol, and may be Local Interconnect Network (LIN), Media Oriented Systems Transport (MOST (registered trademark)), FlexRay (registered trademark), and so forth, for example. Note that the Ethernet (registered trademark) illustrated in the above embodiments has a faster communication speed than CAN. With respect to this point, the first communication protocol may be various types of protocols that have faster communication speeds than the second communication protocol. Although an arrangement has been described in the above embodiments where a first-type frame (e.g., E-message) has an identification flag (e.g., an CAN flag) for determining whether or not the payload of that first-type frame includes first information (e.g., CAN message information) serving as a base for a second-type frame (e.g., CAN message) to be transmitted to the second network, the identification flag may be included in the header of the first-type frame. For example, the E-ECU 200a may include the CAN flag in the header of an E-message. Accordingly, whether or not information to be transmitted to the second network is included in the payload can be determined simply by referencing the header of the E-message, and in a case where the payload of the E-message is encrypted for example, processing can be simplified (decryption can be omitted, etc.). For example, the bit for determining whether or not a global MAC address in the destination MAC address within the header of the E-message may be used as a CAN flag. Also, for example, a CAN flag may be set in the type field within the header of the E-message. Also, for example, the E-ECU 200a may include a CAN flag both within the header and within the payload of the E-message.

(5) In above-described the third embodiment, an example has been illustrated where, in a case of a received E-message containing CAN message information, the hub 100b selects the CAN port for transmitting a CAN message, in accordance with the transmission source MAC address contained in the E-message and the CAN-ID included in the CAN message information of the E-message, according to an addressee table (see FIG. 19). Other than this example, the CAN port for transmitting the CAN message may be selected from the transmission source MAC address contained in the E-message and the destination MAC address, or the CAN port for transmitting the CAN message may be selected from the destination MAC address and CAN-ID. In a case of having received a CAN message from a CAN port, the hub 100b may select one of ports 1 through 5 as the transfer destination of that CAN message, in accordance with the CAN port and the CAN-ID included in the CAN message. In this case, if the hub 100b selects ports 1 through 3, the contents of the CAN message are included in an E-message and transmitted.

(6) Although an example has been illustrated in the above-described embodiments where the E-ECU 200a has a function of transmitting E-messages that include CAN message information and a function of transmitting E-messages that do not include CAN message information, an arrangement may be made where the E-ECU 200a does not have the function of transmitting E-messages that do not include CAN message information.

(7) Although the hubs (hub 100, etc.) illustrated in the above-described embodiments are switches (switching hubs), the function of switching does not need to be had. That is to say, an arrangement may be made where a hub does not determine destination MAC addresses of E-messages, and in a case of having received from one port an E-message in which the CAN flag is not ON for example, that E-message is transferred to all ports to which Ethernet (registered trademark) cables are connected other than that port. This does away with the need for the hub to store a MAC address table for example, enabling reduction in memory.

(8) Although an example has been illustrated in the above-described embodiments where the CAN message information included in E-messages transmitted by E-ECUs is made up of CAN-ID, size, and data, the CAN message information may be made up of any elements as long as information serving as the base for generating a CAN message is included. For example, the CAN message information may be made up of the element group following the CAN message format stipulated in ISO11898-1 (The SOF, CAN-ID, RTR, IDE, r, size, data, and so on through EOF illustrated in FIG. 6). The processing load at the hub or conversion device at the time of transmitting CAN messages to the CAN bus based on E-messages can be reduced by the E-ECUs including CAN message information configured following the CAN message format in E-messages and transmitting. The CAN message information may be made up of information indicating the data (the contents of the data field) of a CAN message, for example.

(9) Although an example has been illustrated in the above-described embodiments where the hub 100 and so forth transmit CAN messages in accordance with multiple CAN message information contained in the payload of a received E-message, in the order of array of the CAN message information, the order of transmission of CAN messages is not restricted to this. For example, at the time of having received an E-message containing multiple CAN message information, the hub 100 or the like may transmit CAN messages in the order of smallest CAN-IDs based on the CAN message information or may transmit CAN message at a transmission order based on an order of priority decided beforehand for each CAN-ID. For CAN messages that need to be periodically transmitted, the hub 100 or the like may wait till the next periodic transmission period to transmit. In a case where the hub 100 or the like decides the transmission order of CAN messages, the E-ECU 200a or the like does not need to perform processing taking the transmission order of CAN messages in to consideration when transmitting E-messages containing multiple CAN message information.

(10) The order of executing the procedures for various types of processing illustrated in the above-described embodiments (e.g., the predetermined procedures and the like illustrated in FIGS. 11, 12, 21, 22, and 25) is not necessarily restricted to the above-described order, and the order of execution may be switched around, multiple procedures may be executed in parallel, part of the procedures may be omitted, and so forth, without departing from the essence of the disclosure.

(11) Devices in the above-described embodiments, such as ECUs, hubs, conversion devices, and so forth, may include other hardware components such as a hard disk device, display, keyboard, mouse, and so forth. The functions of the device may be realized through software by programs stored in memory being executed by a processor, or the functions may be realized by dedicated hardware (digital circuits or the like). Assignation of functions among the components within the device is changeable.

(12) Part or all of the components configuring the devices in the above-described embodiments may be configured as a single system large scale integration (LSI). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program. The parts of the components making up the above devices may be individually formed into one chip, or part or all may be included in one chip. While description has been made regarding a system LSI, there are different names such as IC, LSI, super LSI, and ultra LSI, depending on the degree of integration. The circuit integration technique is not restricted to LSIs, and dedicated circuits or general-purpose processors may be used to realize the same. A field programmable gate array (FPGA) which can be programmed after manufacturing the LSI, or a reconfigurable processor where circuit cell connections and settings within the LSI can be reconfigured, may be used. Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(13) Part or all of the components of which the above-described devices are configured may be configured as an IC card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(14) One aspect of the present disclosure may be, for example, a frame generating method including all or part of the processing procedures illustrated in FIGS. 11, 21, and so forth, or may be a transfer method including all or part of the processing procedures illustrated in FIGS. 12, 22, 25, and so forth. For example, the frame generating method may be, for example, a frame generating method where an ECU connected to a first network generates frames that are transmitted, in a network system including the first network where transmission of first-type frames is performed following a first communication protocol (e.g., the Ethernet (registered trademark) protocol) and a second network where transmission of second-type frames is performed over the bus following a second communication protocol (e.g., the CAN protocol) that is different from the first communication protocol, the first-type frames being generated following the first communication protocol such that first information serving as the base of the second-type frames to be transmitted to the second network, and second information indicating that the first-type frames include information to be transmitted to the second network, are included in the first-type frames. Also, for example, the transfer method is a transfer method used at a network hub in a network system including a first network where transmission of first-type frames is performed following a first communication protocol and a second network where transmission of second-type frames is performed over the bus following a second communication protocol that is different from the first communication protocol, the transfer method including a reception step of receiving a first-type frame, a transfer destination selecting step of determining whether or not the first-type frame received in the reception step includes first information serving as a base for a second-type frame that is to be transmitted to the second network, and selecting a port for sending out a frame based on this first-type frame according to the results of the determining, and a transmission step of transmitting a frame based on this first-type frame to a wired transfer path connected to the port selected in the transfer destination selecting step, with regard to the first-type frame received in the reception step. The method may be a program (computer program) which realizes this method by a computer, or may be digital signals made up of the computer program. For example, the transfer method may be a program that includes a generating step according to the frame generating method (a step of generating the first-type frame following the first communication protocol) and a transmitting step (a step of transmitting the first-type frame generated in the generating step to the first network), wherein the generating step, predetermined information processing to generate the first-type frame is executed such that the first-type frame includes first information serving as a base for the second-type frame to be transmitted to the second network, and second information indicating that the first-type frame includes information to be transmitted to the second network. An aspect of the present disclosure may be the computer program or the digital signals recorded in a computer-readable recording medium, such as for example, a flexible disk, a hard disk, a CD-ROM, MO, DVD, DVD-ROM, DVD-RAM, BD (Blu-ray (registered trademark) Disc), semiconductor memory, or the like. The present disclosure may also be the digital signals recorded in these recording mediums. An aspect of the present disclosure may be an arrangement where the computer program or the digital signals are transmitted over an electric communication line, wireless or cable communication line, a network of which the Internet is representative, data broadcasting, or the like. Also, an aspect of the present disclosure may be a computer system having a microprocessor and memory, where the memory records the computer program, and the microprocessor operates according to the computer program. The program or the digital signals may be recorded in the recording medium and transported, or the program or the digital signals may be transported over the network or the like, and thereby be executed by another computer system that is independent.

(15) Forms realized by optionally combining the components and functions described in the above embodiments and the above modifications are also included in the scope of the present disclosure.

The present disclosure is applicable to an ECU transmitting information to other ECUs connected to a bus in a second network such as a CAN or the like, via a first network such as Ethernet (registered trademark) or the like.

What is claimed is:

1. A network hub for an onboard network system, the onboard network system including a first network for transmission of first-type frames following a first communication protocol, and including a second network for transmission of second-type frames following a second communication protocol that is different from the first communication protocol, the network hub comprising:
  a receiver that receives a first-type frame;
  a processor that determines whether or not the first-type frame received by the receiver includes first information that is a base for a second-type frame to be transmitted to the second network, to obtain a determination result, and selects a port to send a frame based on the first-type frame, based on the determination result; and
  a transmitter that sends the frame based on the first-type frame to a wired transmission path connected to the port selected by the processor,
  wherein the transmitter sends the frame as the second-type frame to a first wired transmission path connected to the port selected by the processor in a first case of determining that the first-type frame received by the receiver includes the first information,
  wherein the transmitter sends the frame as a second first-type frame to a second wired transmission path connected to the port selected by the processor in a second case of determining that the first-type frame received by the receiver does not include the first information, and
  wherein the second-type frame includes the first information in the first-type frame.

2. The network hub according to claim 1,
  wherein the first communication protocol is an Ethernet (registered trademark) protocol,
  wherein the second communication protocol is a Controller Area Network protocol,
  wherein the first-type frame is an Ethernet (registered trademark) frame including an Ethernet (registered trademark) header and data that is a payload,
  wherein the second-type frame is a data frame including a data field,
  wherein the first information indicates content of the data field,
  and wherein the network hub includes a first port connected to an Ethernet (registered trademark) cable.

3. The network hub according to claim 2, further comprising:
  a second port connected to the second network over which the second-type frame is to be transmitted,
  wherein the processor
    selects the second port connected to the second network as the port to send the frame based on the first-type frame, in the first case of determining that the first-type frame received by the receiver includes the first information, and selects the first port connected to the Ethernet (registered trademark) cable as the port to send the frame based on the first-type frame, in the second case of determining that the first-type frame received by the receiver does not include the first information, wherein the transmitter sends the second first-type frame, of which at least second data that is a second payload is same as the data that is the payload of the first-type frame received by the receiver, to the Ethernet (registered trademark) cable, in the second case where the port selected by the processor is the first port to which the Ethernet (registered trademark) cable is connected, and sends the second-type frame including the first information in the first-type frame, in the first case where the port selected by the processor is the second port connected to the second network.

4. The network hub according to claim 3, wherein the second-type frame includes an ID field, a data length code (DLC), and the data field, wherein the first information indicates the ID field, the DLC, and a value of the data field, and wherein the transmitter sends the second-type frame to the second network with a value of the ID field, indicated by the first information, in the ID field of the second-type frame, a value of the DLC, indicated by the first information, in the DLC of the second-type frame, and the value of the data field, indicated by the first information, in the data field of the second-type frame.

5. The network hub according to claim 4, wherein the first information further indicates values of the ID field, the DLC, and the data field for each of a plurality of second-type frames to be transmitted to the second network, and wherein the transmitter sends the second-type frame to the second network by sending the plurality of second-type frames, each of which includes a different part of the first information.

6. The network hub according to claim 3, wherein the second-type frame includes an ID field and the data field, wherein the first information is a set of individual data indicating values of the data field for each of a plurality of second-type frames to be transmitted to the second network, included in the payload of the first-type frame, and wherein the transmitter sends the second-type frame to the second network with, with regard to the set of the individual data, an ID value identified based on placement of individual data in the payload in the ID field of the second-type frame, and a value of the individual data in the data field of the second-type frame.

7. The network hub according to claim 3, wherein the second-type frame includes an ID field and the data field, and wherein the transmitter sends the second-type frame including the first information in the first-type frame to the second network with an ID value, identified based on a value of a destination MAC address in the Ethernet (registered trademark) header within the first-type frame, in the ID field of the second-type frame, and a value of the data field that the first information indicates in the data field of the second-type frame.

8. The network hub according to claim 2, further comprising:

a plurality of ports connected to the Ethernet (registered trademark) cable, the plurality of ports including a second port connected to a device connected to the second network over which the second-type frame is to be transmitted by the Ethernet (registered trademark) cable, wherein, in the first case where the first-type frame received by the receiver is determined to include the first information, the processor selects the second port connected to the device connected to the second network by the Ethernet (registered trademark) cable, as the port to send the frame based on the first-type frame, and wherein the transmitter sends the second first-type frame, of which at least second data that is a second payload is same as the data that is the payload of the first-type frame received by the receiver, to the Ethernet (registered trademark) cable connected to the second port selected by the processor.

9. The network hub according to claim 2, wherein the processor determines the determination result by a value of a predetermined identification flag within the first-type frame received by the receiver.

10. The network hub according to claim 9, wherein the predetermined identification flag is within the Ethernet (registered trademark) header of the first-type frame.

11. The network hub according to claim 2, wherein the processor determines the determination result by a value of a destination MAC address in the Ethernet (registered trademark) header within the first-type frame received by the receiver.

12. A transfer method for a network hub in an onboard network system, the onboard network system including a first network for transmission of first-type frames following a first communication protocol and including a second network for transmission of second-type frames following a second communication protocol that is different from the first communication protocol, the transfer method comprising:

receiving a first-type frame;

selecting a transfer destination by a processor, by determining whether or not the first-type frame received in the receiving includes first information that is a base for a second-type frame that is to be transmitted to the second network, and selecting a port for sending a frame based on the first-type frame according to a determination result of the determining; and transmitting the frame based on the first-type frame to a wired transfer path connected to the port selected in the selecting of the transfer destination, wherein the frame is transmitted as the second-type frame to a first wired transmission path connected to the port selected in the selecting of the transfer destination in a first case of determining that the first-type frame received in the receiving includes the first information, wherein the frame is transmitted as a second first-type frame to a second wired transmission path connected to the port selected in the selecting of the transfer destination in a second case of determining that the first-type frame received in the receiving does not include the first information, and wherein the second-type frame includes the first information in the first-type frame.

13. An onboard network system including a first network for transmission of first-type frames following a first communication protocol and including a second network for transmission of second-type frames following a second communication protocol that is different from the first communication protocol, the onboard network system comprising:

an electronic control unit connected to the first network; and a network hub connected to the first network, wherein the electronic control unit:

generates a first-type frame following the first communication protocol, and transmits the generated first-type frame to the first network, wherein the electronic control unit generates the first-type frame by including first information as a base for a second-type frame to be transmitted to the second network, and second information indicating that the first-type frame includes information to be transmitted to the second network, in the first-type frame, wherein the network hub:

receives the first-type frame, determines whether or not the received first-type frame includes the first information, and selects a port to send a frame based on the received first-type frame, in accordance with a determination result, and sends the frame based on the received first-type frame to a wired transmission path connected to the selected port, based on the received first-type frame, wherein the network hub sends the frame as the second-type frame to a first wired transmission path connected to the selected port in a first case of determining that the first-type frame received by the receiver includes the first information, wherein the network hub sends the frame as a second first-type frame to a second wired transmission path connected to the selected port in a second case of determining that the first-type frame received by the receiver does not include the first information, and wherein the second-type frame includes the first information in the first-type frame.

\* \* \* \* \*